United States Patent
Kihlberg et al.

(10) Patent No.: US 10,681,756 B2
(45) Date of Patent: Jun. 9, 2020

(54) BEACON SYSTEM TO IMPROVE WIRELESS AUDIO COMMUNICATION BETWEEN HEADSET COMMUNICATION DEVICES

(71) Applicant: 3M Innovative Properties Company, St. Paul, MN (US)

(72) Inventors: Roger Kihlberg, Värnamo (SE); Marcus J. Ekblad, Värnamo (SE)

(73) Assignee: 3M Innovative Properties Company, St. Paul, MN (US)

( * ) Notice: Subject to any disclaimer, the term of this patent is extended or adjusted under 35 U.S.C. 154(b) by 233 days.

(21) Appl. No.: 15/944,651

(22) Filed: Apr. 3, 2018

(65) Prior Publication Data
US 2018/0227975 A1 Aug. 9, 2018

Related U.S. Application Data

(63) Continuation-in-part of application No. 15/580,861, filed as application No. PCT/US2016/036459 on Jun. 8, 2016.
(Continued)

(51) Int. Cl.
*H04W 76/14* (2018.01)
*H04W 8/00* (2009.01)
(Continued)

(52) U.S. Cl.
CPC ............ *H04W 76/14* (2018.02); *H04R 5/033* (2013.01); *H04W 8/005* (2013.01);
(Continued)

(58) Field of Classification Search
CPC ..... H04W 76/14; H04W 8/005; H04W 84/20; H04W 76/15; H04R 5/033; H04R 2460/07; H04R 2430/01; H04R 2420/07
See application file for complete search history.

(56) References Cited

U.S. PATENT DOCUMENTS 6,961,541 B2 11/2005 Overy
7,792,059 B2 9/2010 Fonseca, Jr.
(Continued)

FOREIGN PATENT DOCUMENTS

CN 102201873 9/2011
CN 103874226 6/2014
(Continued)

OTHER PUBLICATIONS

International Search Report for PCT International Application No. PCT/US2016/036459, dated Dec. 2, 2016, 7 pages.

*Primary Examiner* — Ivan O Latorre
(74) *Attorney, Agent, or Firm* — Katherine M. Scholz

(57) ABSTRACT

A headset communication device includes at least one processor configured to transmit, via a dedicated virtual communication channel of a wireless communication protocol, local beacon data to one or more remote headset communication devices within a work environment, to discover a remote headset communication device included in the one or more remote headset communication devices by receiving, via the dedicated virtual communication channel of the wireless communication protocol, remote beacon data that is transmitted by the remote headset communication device, to automatically synchronize, based on the remote beacon data, the headset communication device with the remote headset communication device, and, to transmit, via one or more additional virtual communication channels of the wireless communication protocol, local audio communication data to the one or more remote headset communication devices.

19 Claims, 16 Drawing Sheets

Related U.S. Application Data

(60) Provisional application No. 62/173,692, filed on Jun. 10, 2015.

(51) Int. Cl.
  *H04R 5/033* (2006.01)
  *H04W 84/20* (2009.01)
  *H04W 76/15* (2018.01)

(52) U.S. Cl.
  CPC ...... *H04R 2420/07* (2013.01); *H04R 2430/01* (2013.01); *H04R 2460/07* (2013.01); *H04W 76/15* (2018.02); *H04W 84/20* (2013.01)

(56) References Cited

U.S. PATENT DOCUMENTS

| | | | |
|---|---|---|---|
| 8,320,340 | B2 | 11/2012 | Sim |
| 8,385,322 | B2 | 2/2013 | Colling |
| 8,718,301 | B1 | 5/2014 | Jouppi |
| 8,837,724 | B2 | 9/2014 | Rose |
| 8,886,125 | B2 | 11/2014 | Agrawal |
| 2007/0165875 | A1* | 7/2007 | Rezvani .................. H04R 1/10 381/74 |
| 2010/0177718 | A1* | 7/2010 | Harle .................... H04W 72/00 370/329 |
| 2011/0069841 | A1 | 3/2011 | Angeloff |
| 2012/0087292 | A1 | 4/2012 | Grimm |
| 2012/0188998 | A1* | 7/2012 | Philips ................ H04W 56/001 370/350 |
| 2012/0250595 | A1 | 10/2012 | Farkas |
| 2013/0107801 | A1 | 5/2013 | Zheng |
| 2013/0171934 | A1* | 7/2013 | Stankovska ......... H04W 72/082 455/41.2 |
| 2013/0250931 | A1 | 9/2013 | Abraham |
| 2014/0194062 | A1* | 7/2014 | Palin .................... H04W 24/00 455/41.2 |
| 2014/0198778 | A1* | 7/2014 | Fraser .................... H04M 1/00 370/336 |
| 2015/0043568 | A1* | 2/2015 | Coulon ................ H04B 7/2643 370/350 |
| 2015/0172958 | A1* | 6/2015 | Allanki ................ H04W 48/06 370/235 |
| 2015/0229782 | A1* | 8/2015 | Zuidema ............. H04M 1/7253 455/418 |
| 2018/0227975 | A1* | 8/2018 | Kihlberg ............... H04W 76/14 |

FOREIGN PATENT DOCUMENTS

| | | |
|---|---|---|
| KR | 20090032582 | 4/2009 |
| KR | 20120050273 | 5/2012 |

\* cited by examiner

COMMUNICATION PACKET
1010

VIRTUAL CHANNEL INFORMATION
1012

BEACON DATA
(E.G., SERIAL NUMBER)
1016

AUDIO DATA
1022

*FIG. 10*

BEACON SYSTEM TO IMPROVE WIRELESS AUDIO COMMUNICATION BETWEEN HEADSET COMMUNICATION DEVICES

RELATED APPLICATION(S)

The present application is a continuation-in-part application of U.S. application Ser. No. 15/580,861, filed on Dec. 8, 2017, which is a National Stage application under 35 U.S.C. § 371 of PCT/US2016/036459, filed Jun. 8, 2016, which claims the benefit of U.S. Provisional Application No. 62/173,692, filed on Jun. 10, 2015, all of which are incorporated by reference herein in their entireties.

TECHNICAL FIELD

The present application relates to wireless audio communication between headset communication devices.

BACKGROUND

In various situations, groups of users may work or otherwise be located in loud or noisy environments, such as certain manufacturing facilities. In these types of environments, the users may be required to wear personal protective equipment, such as hearing protection headsets, respirators, masks, or other similar equipment. In many cases, users within these environments may wish to communication with each other. As a result, the personal protective equipment worn by these users may include one or more communication devices that enable the users to wirelessly communicate audio data with one another while they wear the equipment within such loud or noisy environments.

SUMMARY

Various techniques described herein provide a beacon system that is implemented by wireless audio communication devices that may be worn by users in these types of loud or noisy environments. The communication devices may be part of or included in personal protective equipment worn by the users, and the use of these communication devices may enable a user to communicate or otherwise interact with other users in a more natural way, as if the user were not necessarily wearing any personal protective equipment. The techniques implement a beacon system that manages wireless audio communication between the communication devices via a wireless communication protocol. Through the use of the beacon system, the various communication devices are configured to more effectively synchronize with one another within a wireless communication network, thereby enabling any communication device to seamlessly join the network without additional configuration and to become a full-fledged member for purposes of audio communication with other communication devices in the network. The wireless communication protocol enables wireless full-duplex voice conferencing functionality without the use of a base station, and the protocol implements a number of dynamically allocated and reusable virtual communication channels, including one dedicated channel that is used exclusively for implementing the beacon system.

In one example, a headset communication device includes a computer-readable storage medium and at least one processor coupled to the computer-readable storage medium. The at least one processor is configured to transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station. The at least one processor is further configured to discover a remote headset communication device included in the one or more remote headset communication devices by receiving, via the dedicated virtual communication channel of the wireless communication protocol, remote beacon data that is transmitted by the remote headset communication device and that is different from the local beacon data. The at least one processor is further configured to, responsive to discovering the remote headset communication device, automatically synchronize, based on the remote beacon data, the headset communication device with the remote headset communication device, and, after synchronizing the headset communication device with the remote headset communication device, transmit, via one or more additional virtual communication channels of the wireless communication protocol, local audio communication data to the one or more remote headset communication devices.

In another example, a computer-readable storage medium stores instructions that, when executed, cause at least one processor to: transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station; discover a remote headset communication device included in the one or more remote headset communication devices by receiving, via the dedicated virtual communication channel of the wireless communication protocol, remote beacon data that is transmitted by the remote headset communication device and that is different from the local beacon data; responsive to discovering the remote headset communication device, automatically synchronize, based on the remote beacon data, the headset communication device with the remote headset communication device; and, after synchronizing the headset communication device with the remote headset communication device, transmit, via one or more additional virtual communication channels of the wireless communication protocol, local audio communication data to the one or more remote headset communication devices.

In another example, a headset communication device includes a memory and at least one processor coupled to the memory. The at least one processor is configured to transmit, via a wireless communication protocol, first communication data to one or more remote headset communication devices within an environment, each headset communication device being associated with a respective user within the work environment and being configured to communicate using the wireless communication protocol to enable voice communication between the users without use of a base station. The at least one processor is further configured to receive, via the communication protocol, second communication data that is transmitted by a remote headset communication device included in the one or more remote headset communication devices, and, responsive to determining that the second communication data includes a defined signal, synchronize the headset communication device with the remote headset communication device by resetting an internal time counter to match a time counter of the remote headset communication device as indicated by the defined signal. The at least one processor is further configured to, after synchronizing the headset communication device with the remote headset communication device, transmit, via the wireless communication protocol, third communication data to the one or more remote headset communication devices.

In another example, a memory stores instructions that, when executed, cause at least one processor of a headset communication device to: transmit, via a wireless communication protocol, first communication data to one or more remote headset communication devices within an environment, each headset communication device being associated with a respective user within the work environment and being configured to communicate using the wireless communication protocol to enable voice communication between the users without use of a base station; receive, via the communication protocol, second communication data that is transmitted by a remote headset communication device included in the one or more remote headset communication devices; responsive to determining that the second communication data includes a defined signal, synchronize the headset communication device with the remote headset communication device by resetting an internal time counter to match a time counter of the remote headset communication device as indicated by the defined signal; and, after synchronizing the headset communication device with the remote headset communication device, transmit, via the wireless communication protocol, third communication data to the one or more remote headset communication devices.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 10 is a conceptual view of an example communication packet, in accordance with one or more techniques of the present disclosure.

DETAILED DESCRIPTION

Figure 1:
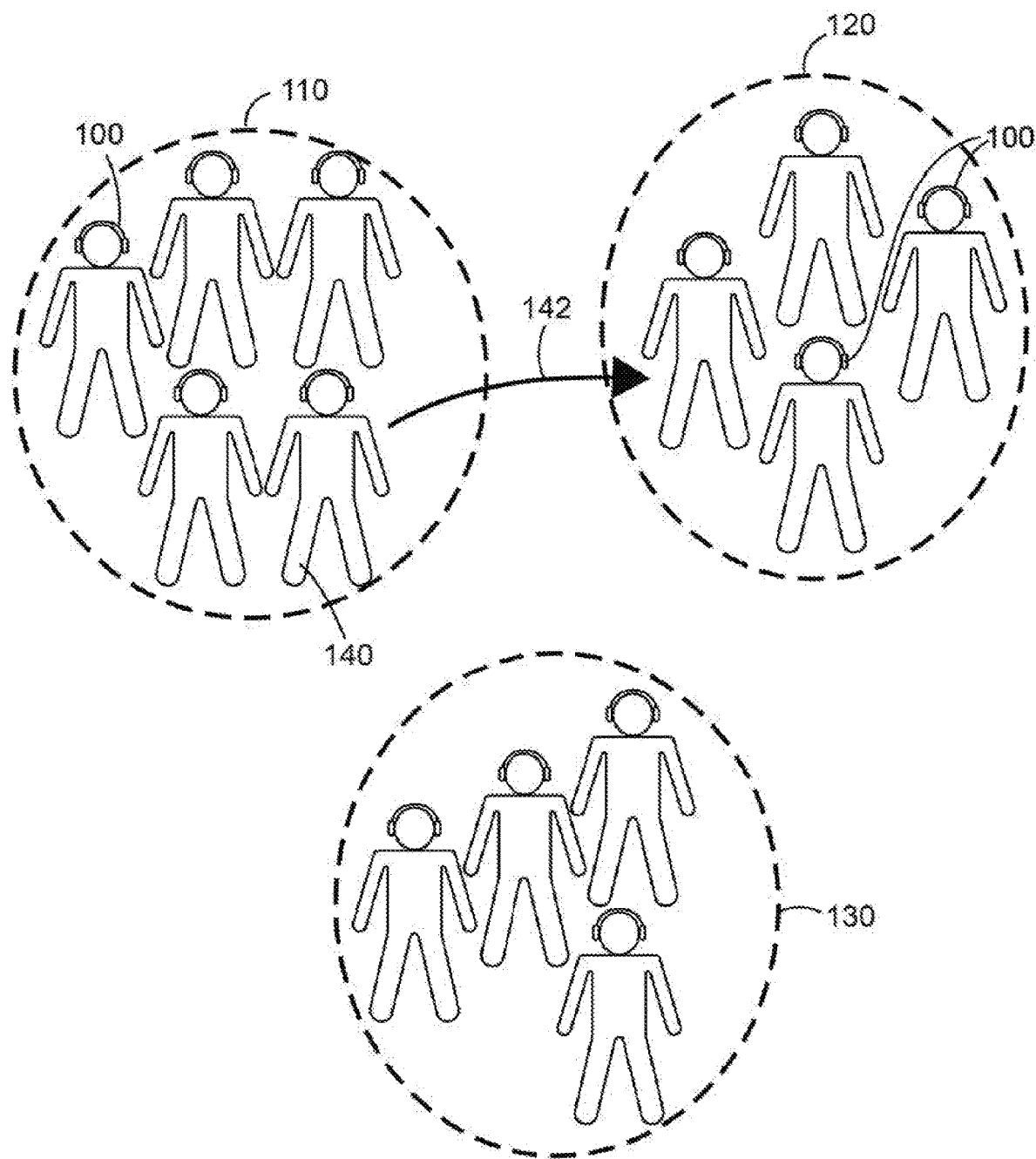
FIG. 1 is a conceptual view of users communicating with each other using respective communication devices, in accordance with one or more techniques of the present disclosure.

As described above, in certain situations, groups of users may work or otherwise be located in loud or noisy environments, such as certain manufacturing or shipping facilities. In these types of environments, the users may be required to wear personal protective equipment, such as hearing protection headsets, respirators, masks, or other similar equipment. In many cases, one or more users may wish to communicate with each other, and thus the personal protective equipment may include one or more communication devices that enable the users to wirelessly communicate audio data while they wear the equipment in loud or noisy environments. Because the communication devices are configured to communicate audio data with other communication devices in a wireless network, users are able to communicate with each other while moving freely and independently within their work environments.

Since there are often many different groups of users within any given work environment, a particular communication device worn by a user may need to be able to communicate with any number of other communication devices that are in proximity to the user. Groups of proximate communication devices may form local communication networks. However, these communication devices may need to synchronize with one another in order to provide reliable and high-quality voice communication functionality, particularly given that the users of these communication devices are often mobile and may move around their environment frequently. Various techniques of the present disclosure enable a communication device to synchronize with other communication devices within a wireless communication network, thereby enabling any communication device to seamlessly join the network without additional configuration and to become a full-fledged member of any given group. The techniques described herein enable users to more easily communicate even in loud or very noisy environments.

Various techniques provide a beacon system that is implemented by wireless audio communication devices that may be worn by users in these types of environments. The communication devices may be part of or included in the personal protective equipment worn by the users, and the use of these communication devices may enable the user to communicate or otherwise interact with other users in a more natural way, as if the user were not necessarily wearing any personal protective equipment. The techniques implement a beacon system that manages wireless audio communication between the communication devices using a wireless communication protocol, such as a Time Division Multiple Access (TDMA) based radio communication protocol. Through the use of the beacon system, the various communication devices are configured to more effectively synchronize with one another within the wireless communication network, thereby enabling any communication device to seamlessly join the network and become a full-fledged member for purposes of audio communication with other devices in the network. The wireless protocol enables wireless full-duplex voice conferencing functionality without the use of a base station, and the protocol implements a number of dynamically allocated and reusable virtual communication channels, including one dedicated channel that is used exclusively for implementing the beacon system.

In various embodiments, a plurality of communication devices can form a network. The communication devices can be configured to send and receive communication data to and from other communication devices using radio frequency signals. Communication data can include digital signals, such as person to person communications, and underlying data, such as the state of the communication device that is transmitting and an identifier code of a communication device that is transmitting. The person to person communications can be a user's voice signals that are carried by modulated radio waves and sent from a first device to a second device (or to a plurality of devices), such that the users can communicate or talk with each other. The communication devices can send and receive data with each other using a time division multiple access protocol (TDMA). TDMA refers to a channel access method for a shared medium network. TDMA allows a plurality of devices to share the same frequency channel by dividing the signal into different time slots. Devices can transmit in succession, one after the other, each using its own time slot. This can allow multiple devices to share the same frequency channel while each using only one part of its channel capacity. For example, the data stream can be divided into frames, and each frame can be divided into a number of time slots. In one example, each frame is divided into 10 time slots. The time slots may include a guard period before, after or both before and after the time period when data transmission occurs.

In many prior art systems using TDMA, the use of the time slots are allocated to certain devices within a network by a central authority, such as by a base station. TDMA is a method of getting several concurrent channels in the air. Methods and systems for assigning, tracking and using these virtual channels are described herein. In various embodiments, a benefit of these methods and systems is eliminating the need for a base station.

The system described herein does not include a central authority for allocating time slots in various examples, and instead each individual communication device determines which time slot to use for its transmission prior to its transmission based on protocols described in the present disclosure. The determination is based on a knowledge of which other time slots are in current use and according to a time slot order scheme that is configured for and stored in a memory of each of the devices in the network. One example of a time slot determination scheme is that the device ready to transmit will use the lowest available time slot. In this example, if there are ten time slots and time slots one to four are in use, the device will use time slot five. Another example of a time slot determination scheme is that the device ready to transmit will use the highest available time slot. In this example, if there are ten time slots and time slots six to ten are in use, the device will use time slot five. Another possible scheme would use be to use the following order for use of ten time slots: 10, 1, 9, 2, 8, 3, 7, 4, 6, 5. Many other time slot order schemes could be used in addition to these examples. Each device in the network is aware of the time slot order scheme and uses the same time slot order scheme. The time slot order scheme can also be referred to as the predetermined order of time slots.

The communication devices and network described herein can provide automatic and more natural feedback to the user regarding a distance between a user and person communicating with the user by controlling the volume of the output to the user. In addition, the communication devices and network described herein can allow users to easily switch from communicating with a first group of users to communicating with a second group of users, such as by simply increasing the distance between the user and the first group of users and decreasing the distance between the user and the second group of users.

The communication devices described herein can control the output volume level of the communication device, such that the communication device can reduce the output volume based on the distance between the receiving communication device and the transmitting communication device. In various embodiments, the greater the distance between the two devices the more the output volume of the receiving communication device is reduced. Similarly, as a receiving communication device is moved closer to a transmitting communication device the volume output of the receiving device can be increased, such as to mimic the increase in volume a user would hear as they move towards another user that was talking to him/her.

In many situations, the communication devices and network can allow for a user to communicate with first group of people, then move away from the first group of people and towards a second group of people to communicate with the second group of people. In one example, once the user has moved past a threshold distance from the first group of people, the user will no longer hear communications with the first group of people. Once the user has moved within the threshold distance to the second group of people, the user will start to hear communications with the second group of people. When the communication device is beyond the threshold distance, the communication device can be receiving communication data from a different communication device, but the user will not hear any of the communication, because the volume will be reduced to zero. In some examples, the system is configured to use a table to determine how volume will be reduced depending on the distance. In some examples, a table is used to determine how volume will be reduced depending on the distance and the table stores a first threshold.

Configuring a group of users to communicate based on distance from each other can mimic a standard scenario where a person without a communication device enters a conversation with a group of people talking. The configuration can also allow the user to walk or move away from the first group of people and towards a second group of people. In that scenario, at some point the person will want to stop communicating with the first group of people and start communicating with the second group of people. The devices and network described herein can allow a user a more natural conversational experience with different groups, without manually needing to change a channel or frequency to communicate with different groups.

In various embodiments, the network of communication devices can be formed without a designated base station. In various embodiments, the network of communication device can be baseless, such that there is not a single device that is designated as the base or acts as a central authority to allocate the use of the time slots to certain devices within a network. In contrast, in some networks, a designated base unit can receive and transmit all communications, such that all of the devices in the network send and/or receive communication data from the base unit. The network of communication devices described herein does not require a designated base unit. In various embodiments, the network does not require any registration protocol to join the network. In some embodiments, the communication devices can be listening for data to receive, such that a communication device is always able to receive communication data. In other embodiments, the communication devices can be listening for data to receive at selected intervals, such as for 1 millisecond (ms) of every 10 ms, or other intervals. The devices are listening for data on an on-going basis, whether continuously or at intervals, when they are powered on. The devices store that information in o, so at any point in time, each device is aware of whether another device is in the master state and whether another device is transmitting. When a device is in the master state, that device acts as a beacon to facilitate synchronization to that device. The other devices synchronize to the device in the master state, setting their time counters to match the time counter of the device in the master state.

The term "listening" means that the receiver can be receiving communications from devices in the network, or that the receiver can be receiving a sampling of communications from devices in the network. As used herein, the term "listening" also means that a receiver of the device is linked to a processor and a memory component of the device and the device is configured to store in memory the current status of each time slot in the system.

The devices included in a network of devices can be in one of several states. Each device's ability to transmit data can be dependent upon which state the device is currently in. A device can change states in two different situations. First, a device can change states if the device starts or stops receiving data from another device. Second, a device can change states if the device starts or stops transmitting data to other devices.

In various embodiments, the devices can transmit data to and receive data from other devices using radio frequencies. In some examples, the device can transmit and receive using one of the internationally-reserved Industrial, Scientific and Medical (ISM) radio bands. In some embodiments, the devices can use a frequency of at least 868 MHz. In some embodiments, the devices can one of the ISM radio bands having a frequency of at least 868 MHz, at least 2.4 GHz, or at least 5.725 GHz.

In some embodiments, the states can include a master state, an idle state, a guest state, and a slave state. The devices can change state prior to transmitting or upon receiving communication data. In various embodiments, a single device or no devices can be in the master state. In various embodiments, one device, a plurality of devices, or no devices can be in the idle state. In various embodiments, one device, a plurality of devices, or no devices can be in the guest state. In various embodiments, one device, a plurality of devices, or no devices can be in the slave state.

When a device is in the master state, the device can be transmitting data to one or more other devices. A device in the idle state can be idle, such that it is not sending or receiving any data. A device in the slave state can receive or send data. A device in the guest state can receive data from other devices.

A network, as the term is used herein, is a group of communication devices that are using the same protocols to communicate, and using the same frequency ranges to communicate. The physical distance between each pair of communication devices in the network could limit whether transmissions are actually received.

In various embodiments, all of the devices in the network initially have equal access to being in a master state. If one device is in the master state, that device is configured to behave in a manner somewhat similar to a base unit in that all of the other communication devices can synchronize to the device that is in the master state. However, unlike a base station, if a device in the master state fails or is lost, a different device can enter the master state, such that devices will still be able to transmit and receive data to and from other devices. Because each device in the network has the ability to be in the master state, it is possible to add devices to the network, and have them immediately communicate with the network, without a registration or other handshake protocol with a base station, in some examples of the system. In some embodiments, the network does not have communication-related limits on how many communication devices can be a part of the network.

In various embodiments, all of the devices in the network can all be similar devices, such as similar headsets, similar hearing protection headsets, similar respirator masks, or similar welding helmets. In some embodiments, the devices in the network can include different physical structures, such as some devices being headsets and other devices being respirator masks. Many other examples of forms and different combinations of forms are possible.

FIG. 1 shows a schematic representing users of communication devices as described herein. Various environments where the communication devices 100 can be used can include various groups of people that only want to communicate with the group they are part of.

FIG. 1 shows a first group or network of users 110, a second group or network of users 120 and a third group or network of users 130. The first group of users 110 can include a plurality of people. Each person in the first group of users 110 can have a communication device 100. The second group of users 120 can include a plurality of people. Each person in the second group of users 120 can have a communication device 100. The third group of users 130 can include a plurality of people. Each person in the third group of users 130 can have a communication device 100.

In some embodiments, a group of users can be limited, such as by requiring an access code or password to join the group. In some embodiments, a user can opt out of a group such as by muting all of the incoming transmissions.

The first group of users 110 can represent a first network of people communicating, such that the members of the first group 110 can communicate with each other but not with people outside of the first group 110. Similarly, the second group of users 120 and the third group of users 130 can be communicating within their groups. In various embodiments, the size of the group can be defined by a physical distance, such as a radius from the device that is currently transmitting communication data.

In various embodiments, the plurality of communication devices can form a network, such as the communication devices in the first group of users 110. The network can include a plurality of communication devices. The communication devices can be configured to send and receive communication data to and from other communication devices. Communication data can include digital signals, such as person to person communications, and underlying data. Examples of underlying data include the state of the communication device that is transmitting, a time clock signal of the communication device that is transmitting and an identifier code of the communication device that is transmitting. In various embodiments, the underlying data can include an input sound level, such as the volume of the transmitting user's speech or the ambient sound. Such underlying data can be used to reproduce increases in volume to the receiving user. The reproduction of increases in volume to the receiving user can override the distance muting described herein, such as to relay a shouted warning or command. In various embodiments, warnings or commands over a certain volume level can override the decreasing volume output based on distance between units function that is described herein, such as to provide a warning or command to devices that are within the radio range. The person to person communications can be the users' voices that are processed and sent from a first device to a second device (or to a plurality of devices), such that the users can communicate or talk with each other. The communication devices can send and receive data with each other using a TDMA protocol. In various embodiments, the TDMA protocol is used in combination with carrier division multiple access (CDMA) protocol, which involves spreading communications over different frequencies.

In various embodiments, all of the communication devices can be initially in an idle state, such as when the communication devices are turned ON. Once a communication device intends to transmit or begins to receive any communication data, the communication device can determine if a communication device within the network is in a master state. A device makes this determination based on the information it has stored in memory regarding the status of each of the time slots. If there is a device transmitting information in the first time slot in the predetermined order of time slots, then that device can be in the master state. Alternatively, a device in the master state could be in any of the time slots, such as when multiple time slots are occupied, the device in the master state is lost and a device in one of the other time slots enters the master state. For example, a first device in the first timeslot is in the master state. The first device stops transmitting and exits the master state, at which point a second device in a different timeslot, such as the second timeslot, can enter the master state. If the second device exits the master state, a third device in the third timeslot can enter the master state. If the communication device is about to send data and there is no other device in the master state, the device can enter the master state, regardless of what time slot the device is in. If the communication device is about to send data and there is another communication device in the master state, the communication device that is about to send data can enter the slave state and take the next available time slot. In some embodiments, the next available time slot is the lowest available time slot. In some embodiments, the next available time slot is the highest available time slot. In other embodiments, the communication device can enter a next available time slot within a predetermined order. Examples of a predetermined order are numerical order, reverse numerical order, and other ordering schema, such as 4, 1, 3, 2 for a four time slot system. In various embodiments, a device can enter the slave state when it receives communication data from a communication device in the master state. In various embodiments, a device can enter the guest state when it receives communication data from a device in the slave state. A device in the guest state can receive communication data from other devices within the network, but will not be able to transmit data to the other devices. In various embodiments, all of the devices within a network synchronize to the device that is in the master state. Devices can synchronize to the device in the master state, such as to reset the internal time count in each device to match the internal time count of the device in the master state. Frequent synchronization is necessary in TDMA systems, because electronic devices utilizing crystals to keep time counts will drift over time. The battery voltage and temperature can affect the amount of time count drift. In prior art systems, the communication devices in a network often sync to a base station. In contrast, in various embodiments of the system described herein, there is no designated base station and each individual device that is in the master state provides a signal in the data header of its communications which causes all of the other devices in the network to move their clocks to match it, at the time of that transmission.

As mentioned above, a network can be defined by a physical distance. In various embodiments, the communication device can relay at least some communication data to a user through a speaker. The speaker can produce a sound wave that can be heard by the user. In various embodiments, the volume of the speaker's output can be at least partially influenced by the receiving device's distance from the sending device. In various embodiments, the volume of the speaker can be inversely related to the distance between the receiving communication device and the sending communication devices, such that as the distance between the two is increased the volume is decreased. A larger distance between two devices can result in a larger reduction of the volume. In various embodiments, the distance between the two devices can be determined using the signal strength, such as the received signal strength indicator (RSSI) value. RSSI is a measurement of power present in a received radio signal. When two communication devices are in closer proximity to each other, the RSSI will be greater than when the devices are further from each other. When RSSI is programmed as a parameter inside of a chip, it is often a parameter value without a measurement unit. In some embodiments and contexts, RSSI is calibrated into decibels (dB) or decibels relative to one milliwatt (dBm). In some examples, the system is configured to use a table to determine how volume will be reduced depending on the distance.

Tables 1 and 2 below show examples of how volume output could be decreased in relation to increases in the distance or range between the devices. The distances in Tables 1 and 2 are expressed in meters (m).

TABLE 1

| RSSI | Approximate Range (m) | Audio Volume |
|---|---|---|
| 250 | 0 | 100% |
| 200 | 2 | 100% |
| 150 | 3 | 100% |
| 100 | 4 | 100% |
| 75 | 6 | 80% |
| 50 | 8 | 25% |
| 25 | 10 | 0% |

TABLE 1-continued

| RSSI | Approximate Range (m) | Audio Volume |
|---|---|---|
| 12 | 20 | 0% |
| 9 | 30 | 0% |
| 6 | 40 | 0% |

TABLE 2

| RSSI | Approximate Range (m) | Audio Volume |
|---|---|---|
| 250 | 0 | 100% |
| 200 | 2 | 100% |
| 150 | 3 | 100% |
| 100 | 4 | 100% |
| 75 | 6 | 100% |
| 50 | 8 | 100% |
| 25 | 10 | 100% |
| 12 | 20 | 50% |
| 9 | 30 | 25% |
| 6 | 40 | 0% |

In various embodiments, when the distance between the transmitting device and the receiving device is greater than a first threshold distance, the volume can be at zero (muted). In various embodiments, when the distance between the transmitting device and the receiving device is greater than a second threshold distance, the volume can be decreased to a non-zero value but not muted. The first threshold distance is larger than the second threshold distance. For example, in the embodiment shown in Table 1 the first threshold distance is 10 m and the second threshold distance is 6 m. For example, in the embodiment shown in Table 2 the first threshold distance is 40 m and the second threshold distance is 20 m. In some embodiments, the distances to volume relationships can be adjustable, such that a technician or user can adjust the volume levels at different distances to meet the needs of the environment in which the devices are being used. In various embodiments, these adjustments can be made in a software configuration file that is stored in the memory of each device in the network.

In various embodiments, the first threshold distance can be at least 10 m. In various embodiments the first threshold distance can be at least 20 m. In various embodiments, the first threshold distance can be at least 30 m. In various embodiments, the first threshold distance can be at least 40 m. In various embodiments, the first threshold distance can be 40 m or less. In various embodiments, the first threshold distance can be at least 30 m and not more than 50 m. In various embodiments, the first threshold distance can be at least 10 m and not more than 50 m. In various embodiments, the first threshold distance can be at least 10 m and not more than 70 m. In various embodiments, the first threshold distance can be at least 10 m and not more than 20 m. In various embodiments, the first threshold distance can be at least 10 m and not more than 30 m. In various embodiments, the first threshold distance can be at least 8 m and not more than 15 m.

In various embodiments, the second threshold distance can be at least 4 m. In various embodiments, the second threshold distance can be at least 6 m. In various embodiments, the second threshold can be at least 8 m. In various embodiments, the second threshold can be 20 m or less. In various embodiments, the second threshold can be 15 m or less. In various embodiments, the second threshold can be 10 m or less. In various embodiments, the second threshold distance can be at least 4 m and not more than 8 m. In various embodiments, the second threshold distance can be at least 4 m and not more than 10 m. In various embodiments, the second threshold distance can be at least 4 m and not more than 14 m. In various embodiments, the second threshold distance can be at least 4 m and not more than 20 m.

In reference to FIG. 1, if user 140 starts to walk away (shown by arrow 142) from the first group of users 110, the volume will be gradually reduced as the user increases his/her distance from a user that is transmitting communication data. As user 140 nears the second group of users 120 (passes the first threshold), the user 140 will begin to hear the communications of the second group of users 120. Once the user is at a distance from a transmitter within the second group of users that is equal to or less than the second threshold, the user 140 will have the volume output at 100%. In various embodiments, each device that is receiving data can adjust the volume based on its distance from the transmitting device.

Figure 2:
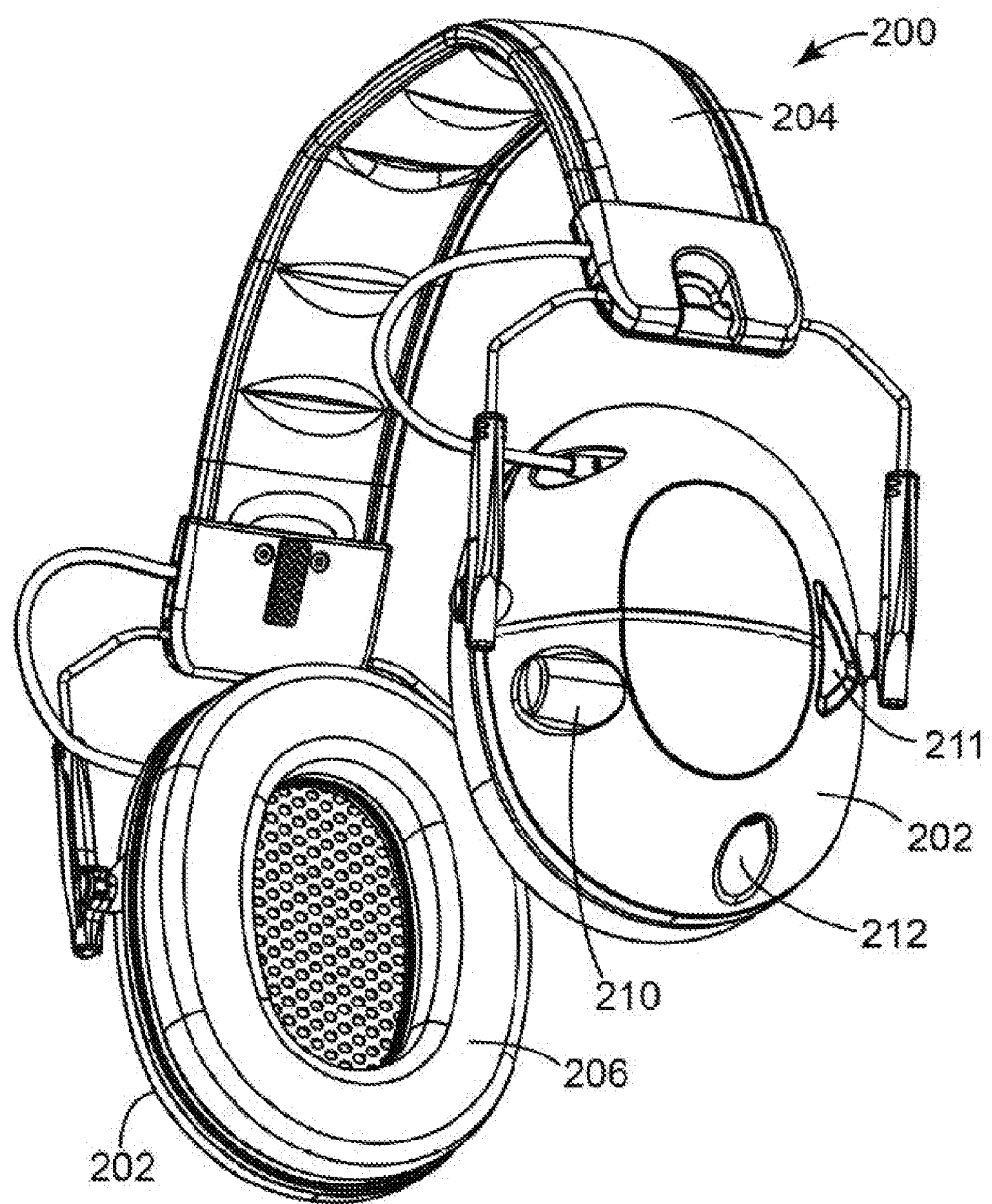
FIG. 2 is a perspective view of an example communication device, in accordance with one or more techniques of the present disclosure.

FIG. 2 shows a perspective view of an example of a communication device 200. The communication devices described herein can be incorporated into many different pieces of equipment, such as a headset, a mask, or a respirator.

FIG. 2 shows the communication device 200 in the form of a hearing protection headset. In various embodiments, the headset can include an ear cup 202 and a headband 204. The headset can include two ear cups 202. The headband 204 can couple a first ear cup 202 with a second ear cup 202. The headband 204 can be arced, such as to extend over the top of a user's head while the headset is in use. The headband 204 can be flexible, such as to allow the user to spread the first ear cup 202 from the second ear cup 202 when the user is putting on the headset. The headband 204 can include padding, such as to at least partially conform to the user's head and increase the user's comfort.

The ear cups 202 can be configured to fit at least partially around a user's ear, and be disposed on the side of a user's head while in use. The ear cup 202 can define a cavity. The cavity can be configured for a user's ear, a human ear, to fit within, while the user is wearing the headset. The ear cup 202 can include a seal ring 206. The seal ring 206 can be ring shaped, such as to extend around the user's ear. The seal ring 206 can be flexible and able to conform to the user's head. The seal ring 206 can provide a seal between the ear cup 202 and the user's head, such as to reduce the amount of noise or sound waves that reach the user's ear, thereby at least partially protecting the user's ear from external noises. The seal ring 206 can include leather, cloth, rubber, plastic, or a polymer, such as polyurethane.

In an alternative embodiment, the headset can include a housing that is configured to fit at least partially within the outer portion of a user's ear, such as within a portion of the auricle or pinna. In various embodiments, the headset can include two housings, such as a right housing configured to fit at least partially within the user right ear and a left housing configured to fit at least partially within the user left ear. In various embodiments, the right housing and left housing can be substantially identical, such that the right housing can be used in association with the left ear and the left housing can be used in association with the right ear.

The headset can include a microphone 211 such as to pick up communications from a user. In various embodiments, the headset can include an input connection and a microphone can be connected to the input connection. In various embodiments, a microphone 211 is provided on each of two ear cups.

One of the ear cups 202 can include a knob 210. The user can rotate the knob 210 to control the electronics of the communication device, such as to turn the electronics "ON" or "OFF", or to increase or decrease the volume from the speakers in the ear cups 202. Instead of a knob 210, many other types of input devices can be used, including buttons, switches or a remote control device. In various embodiments, the electronics can include a processor. The processor can be configured to carry out the steps discussed below in reference to FIGS. 3-6.

The ear cups 202 can include an input connection 212. The input connection 212 can allow a user to connect an external device into the communication device, such as an AM/FM radio, a two-way radio, an MP3 player, a cellphone, a microphone or the like. The user can hear the external device through the one or more speakers disposed in the ear cups 202. In various embodiments, the input connection 212 can accommodate a 3.5 mm audio input. In various embodiments, the external audio device can be connected to the headset through a wireless connection, such as Bluetooth connection. In various embodiments, the external audio device can be built in or integral with the headset.

A mute button (not shown) or other user input device can be provided on a communication device, in some embodiments, to selectively mute the speakers, selectively turn off the microphone or both. Such controls can allow a user to have privacy or concentration.

In some embodiments, the transmission of data by a communication device can be triggered automatically, such as when threshold voice levels are picked up by a microphone as when using a voice-operated switch. In some embodiments, transmission of data can require an additional user input, in addition to a threshold level of sound being picked up by a microphone. Examples of additional user input that can be required for transmission include a button or other input device (not shown) that is activated once by a user to initiate a transmission or a button or other input device that is held down or otherwise activated throughout the time that the user is speaking. In various embodiments, some or all of the communication devices are push-to-talk (PTT) communication devices.

Figure 3:
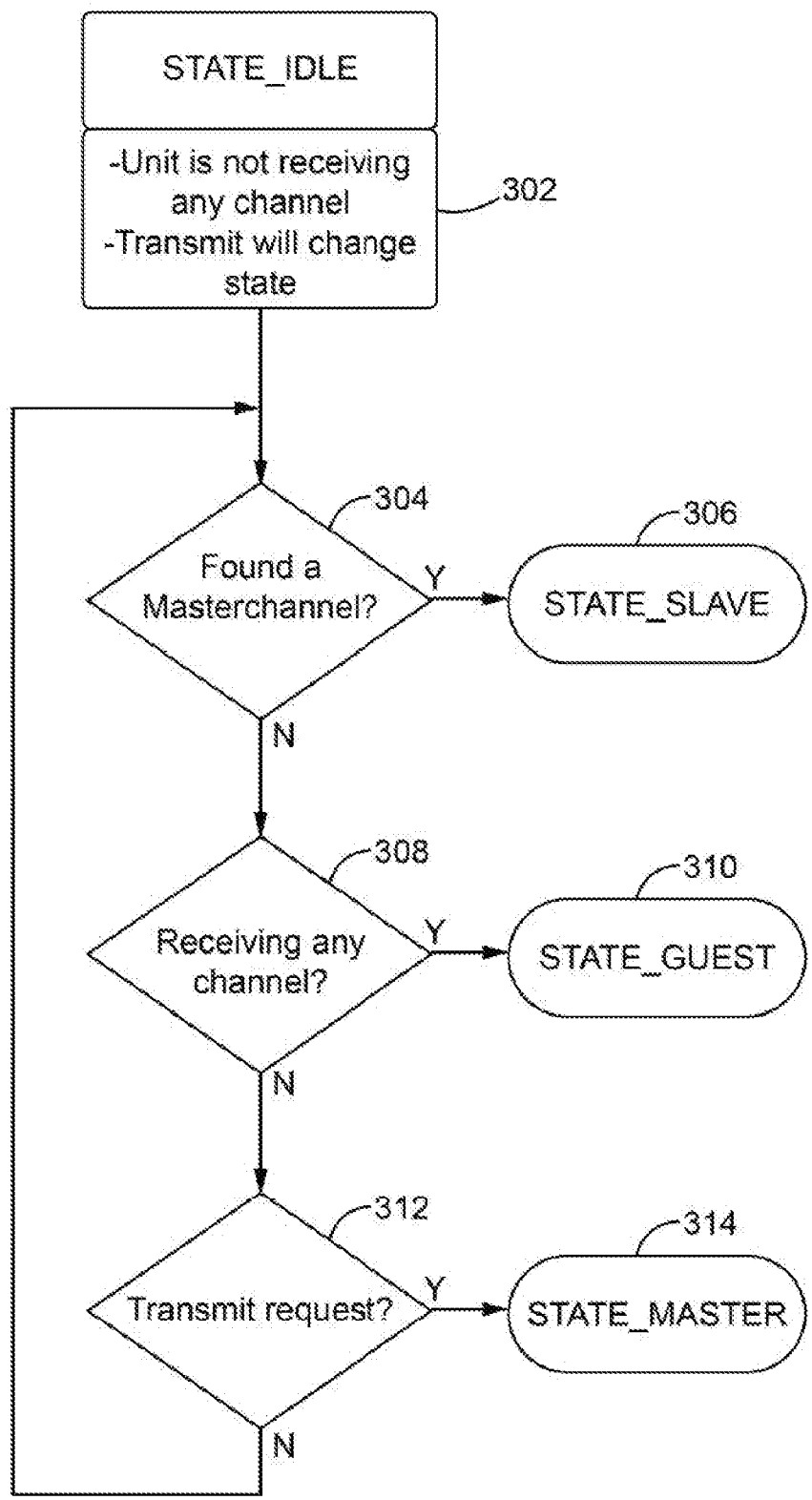
FIG. 3 is a flow chart depicting a portion of an example communication process, in accordance with one or more techniques of the present disclosure.

FIGS. 3-6 show flow charts depicting different aspects of the communication devices and the network the communication devices can create, according to various embodiments. FIG. 3 shows a flow chart depicting how a communication device determines what state it is in, according to an example.

Once a communication device is turned ON, the communication device can be in an idle state 302. When the communication device is in an idle state, the communication device is not transmitting or receiving any communication data. Once a communication device attempts to transmit or begins receiving communication data, the device can leave the idle state. The communication device can leave the idle state and enter the master state, the slave state, or the guest state, such as when the device is about to transmit communication data or begins receiving communication data.

In various embodiments, each device is always listening on all time slots. When a device detects a transmission, the device changes states, if appropriate according to the system described herein. In various embodiments, the device waits until it has detected more than one packet of communication data, such as at least three packets of communication data, before changing states.

When a communication device is attempting to transmit or begins to receive a communication, the communication device can determine if a different communication device is currently in the master state 304. If the communication device determines that a different communication device is in the master state, the communication device can go from the idle state to the slave state 306. The slave state is described in more detail in regards to FIG. 5.

If the communication device determines that there is not a different communication device in the master state, the communication device can determine if it is receiving communication data from a communication device in a non-master state 308. If yes, the communication device can enter the guest state 310. The guest state is described in more detail in regards to FIG. 6.

If the communication device does not find a different communication device in the master state and the communication device is attempting to transmit communication data 312, the communication device can enter the master state 314. The master state is described in more detail in regards to FIG. 4.

When a communication device is in the master state, the communication device can transmit communication data. When a communication device is in the slave state, the communication device can transmit or receive communication data. When a communication device is in the guest state, the communication device is able to receive communication data, but the communication device cannot transmit communication data. In various embodiments of the network, all of the devices can synchronize to the communication device in the master state.

Figure 4:
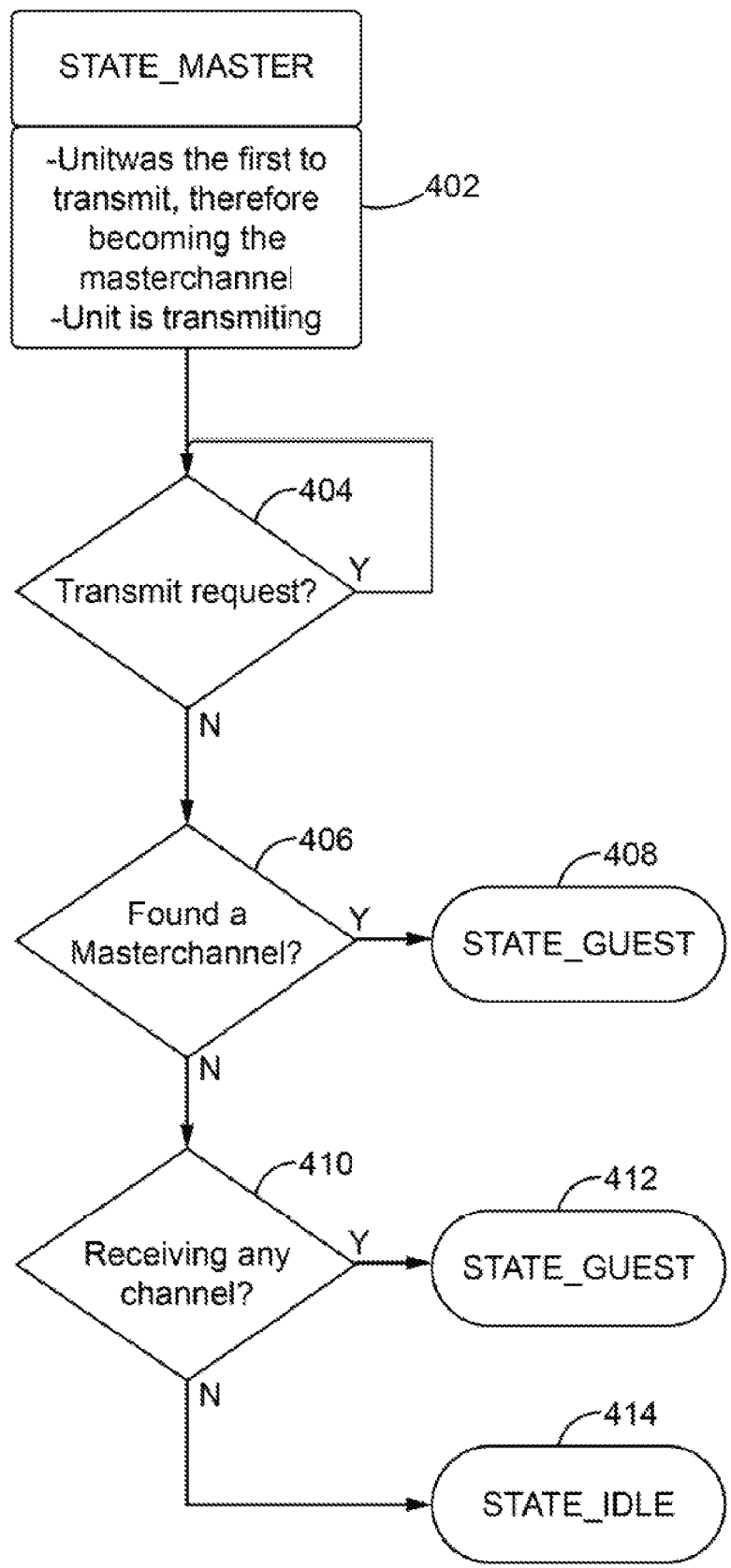
FIG. 4 is a flow chart depicting a portion of the example communication process, in accordance with one or more techniques of the present disclosure.

FIG. 4 shows a flow chart depicting a portion of the process of a device in the master state, according to various embodiments. A communication device in the master state 402 can be the first communication device that transmitted. In other situations, the communication device in the master state was in the lowest time slot (or other next time slot based on a predetermined order, such as the highest) when the previous communication device in the master state was lost. In various embodiments, the device that was in the master state can be lost, when the other devices have not received any data from the device in the master state within a master transmission time period. In various embodiments, the master transmission time period can be about 0.5 seconds. In various embodiments, the master transmission time period can be at least 0.5 second. In various embodiments, the master transmission time period can be at least 1 second. In various embodiments, the master transmission time period can be at least 1.5 seconds. In various embodiments, the master transmission time period can be less than 3 seconds. In various embodiments, the master transmission time period can be less than 2 seconds. In various embodiments, the master transmission time period can be less than 1.5 seconds. In various embodiments, the master transmission time period can be less than 1 seconds.

When in the master state, a communication device can transmit communication data to other communication devices 404. The communication device in the master state can send communication data as desired. In various embodiments, once the communication device in the master state finishes transmitting, the communication device can enter the slave state, the idle state, or the guest state. In various embodiments, if the device that was in the master state receives communication data from a different unit that has already entered the master state, the device that was in the master state can enter the slave state. In various embodiments, if the device that was in the master state receives communication data from a device that is not in the master state, the device that was in the master state can enter the guest state. If the device that was in the master state is not receiving any communication data, the device can enter the idle state.

If the communication device in the master state is not transmitting communication, such as the communication device is receiving communication data from a different communication device, the communication device in the master state can determine if a different communication device is in the master state 406. If the communication device is receiving communication data from a different communication device in the master state, the communication device can enter the slave state 408.

If the communication device in the master state does not find another communication device in the master state, the communication device can determine if it is receiving communication data from another communication device 410. If the communication device is receiving communication data, the communication device can enter the guest state 412. If the communication device is not receiving communication data from another device, the communication device can enter the idle state 414.

In various embodiments of the system, the network does not define constraints on a number of devices that can be in the slave state. The number of devices that are able to transmit to other devices is equal to the number of time slots, with one of those transmit-capable devices being in the master state. The number of devices that can be in the slave state is unlimited, in various embodiments.

In various embodiments, the system described herein does not include a central authority for allocating time slots but includes a central authority for encryption of communications. In various embodiments, the system described herein does not include a central authority for allocating time slots but includes a central authority for registration of the devices participating in the network. In various embodiments, any encryption and/or registration associated with network access functionality can be decentralized, such that there is not one device that controls access to the network.

Figure 5A:
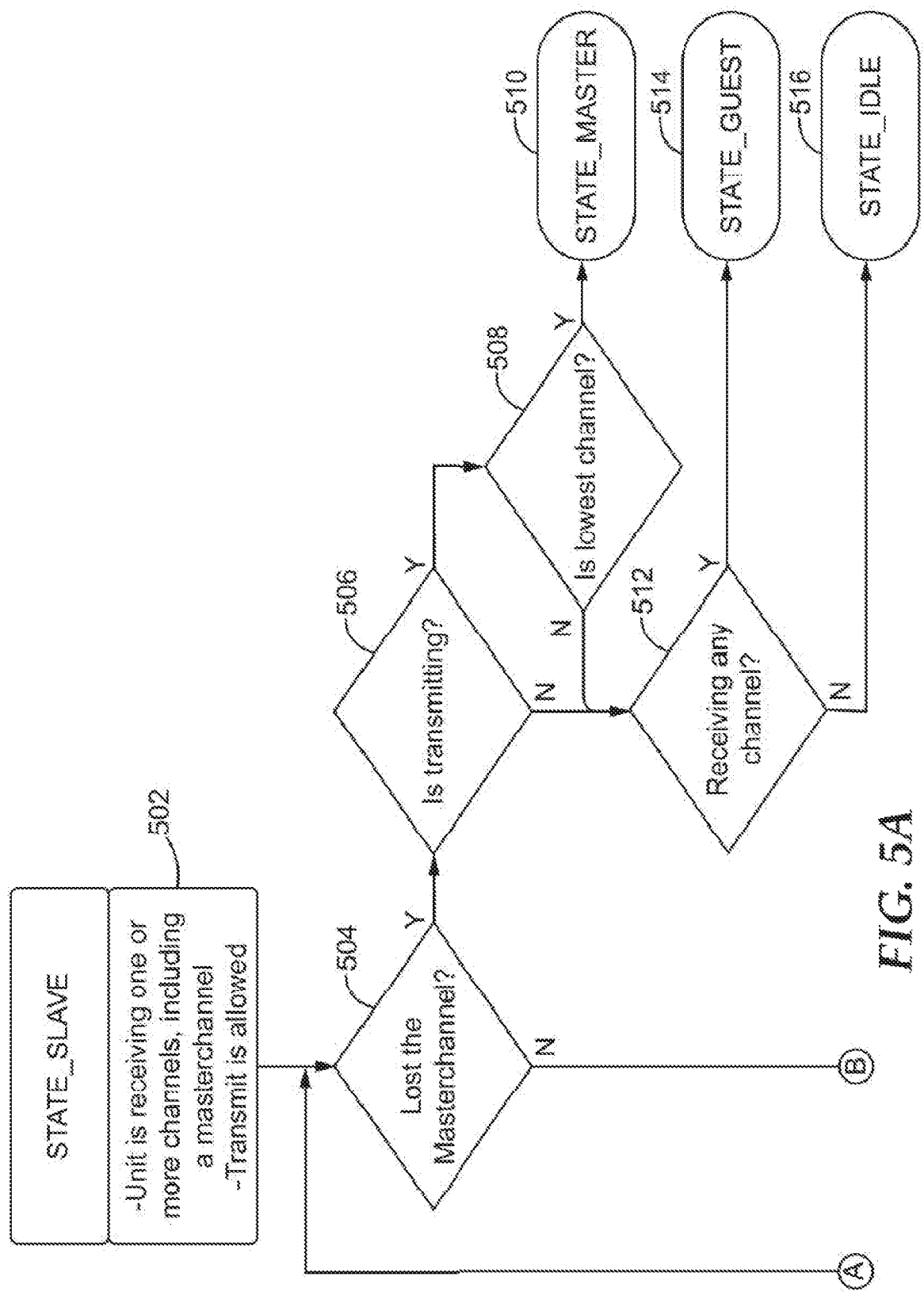
FIG. 5A and FIG. 5B collectively show a flow chart depicting a portion of an example communication process, in accordance with one or more techniques of the present disclosure.
Figure 5B:
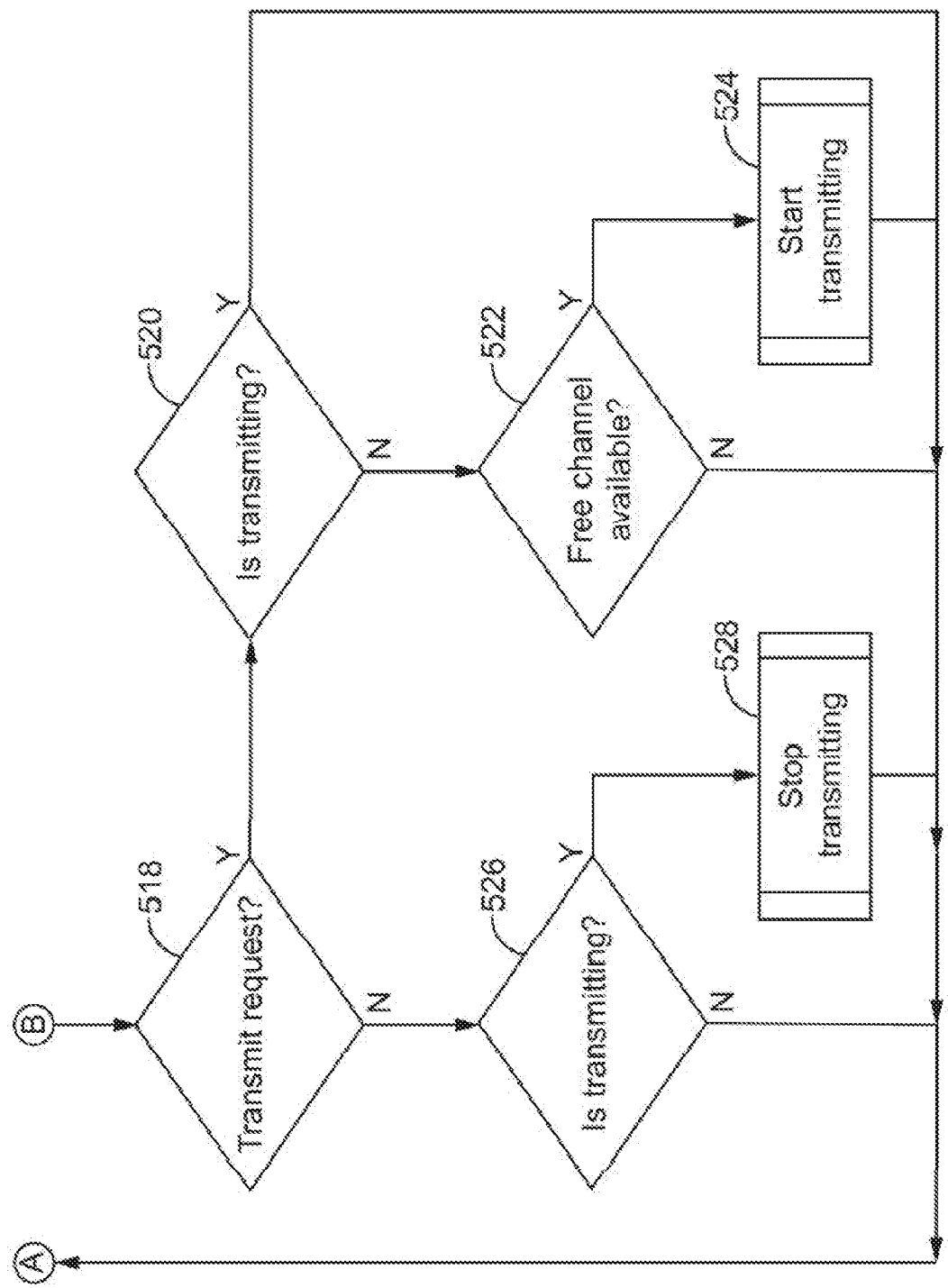

FIGS. 5A and 5B together show a flow chart depicting a portion of the process of a device in the slave state, according to various embodiments. FIG. 5B is a continuation of FIG. 5A, with line A from FIG. 5B extending to line A in FIG. 5A, and Line B in FIG. 5A extending to line B in FIG. 5B.

A communication device in the slave state 502 can be a communication device that it is one of the time slots. In various embodiments, there can be ten time slots available for communication devices, such that ten communication devices can be in the slave state in a network of communication device. In various embodiments, there can be four time slots available for communication devices. In various embodiments, there can be at least four time slots and no more than 12 time slots. In various embodiments, there can be at least four time slots and no more than 20 time slots. In the slave state a communication device can transmit communication data to other communication devices and the communication device can receive communication data from other communication devices.

A communication device in the slave state can determine if the communication device in the master state has been lost or not 504. If the communication device in the master state has been lost, the communication device in the slave state can determine if it is transmitting 506. If the communication device in the slave state is transmitting, the communication device can determine if it is in the lowest time slot 508. If the communication device is in the lowest time slot, the communication device can enter the master state 510. If the communication device is not in the lowest time slot, the communication device can finish its transmission and the communication device that was in the first time slot of the predetermined order of time slots can enter the master state.

In other embodiments, when the communication device in the master state is lost, the communication device in the highest time slot can enter the master state. In another embodiment, the communication device that enters the master state can be based on a predetermined order, such as a random predetermined order. A predetermined order can have the numbered time slots in a designated order. In one example, when there are four time slots, the order could be the third time slot, then the first time slot, then the fourth time slot and then the second time slot.

If the communication device in the master state was lost and a communication device in the slave state is not trying to transmit 506, the communication device in the slave state can determine if it is receiving any communication data 512. If the communication device is receiving communication data from a different communication device, the communication device in the slave state can enter the guest state 514. If the communication device is not receiving any communication data, the communication device can enter the idle state 516. In various embodiments, the communication device can determine that it is not receiving any communication data if the device does not receive any data within a given time period, such as 0.5 seconds. In another embodiment, the communication device can determine that it is not receiving any communication data is the device does not receive any data within a number of time slots, such as at least four time slots and not more than 50 time slots, or 16 time slots.

If the communication device in the master state has not been lost, the communication device in the slave state can determine if it is trying to transmit 518. If the communication device in the slave state is trying to transmit, it can determine if it is transmitting 520. If it is transmitting, the communication device transmits the communication data and remains in the slave state. If it is not transmitting, but is attempting to, the communication device can determine if a time slot is available 522. If a timeslot is not available, the communication device will not be able to transmit. If a time slot is available, the communication device will begin to transmit 524.

In various embodiments, each device can internally keep track of which timeslots are occupied, and therefore also which timeslots is the next available in the predetermined order of time slots. A device that wants to transmit can take the next available timeslot. Once the device starts to transmit, the device can remain in the timeslot for the entire transmission.

If the communication device in the slave state is not requesting to transmit, it can determine if it is transmitting 526. If it is transmitting, the transmission can be stopped 528.

Figure 6:
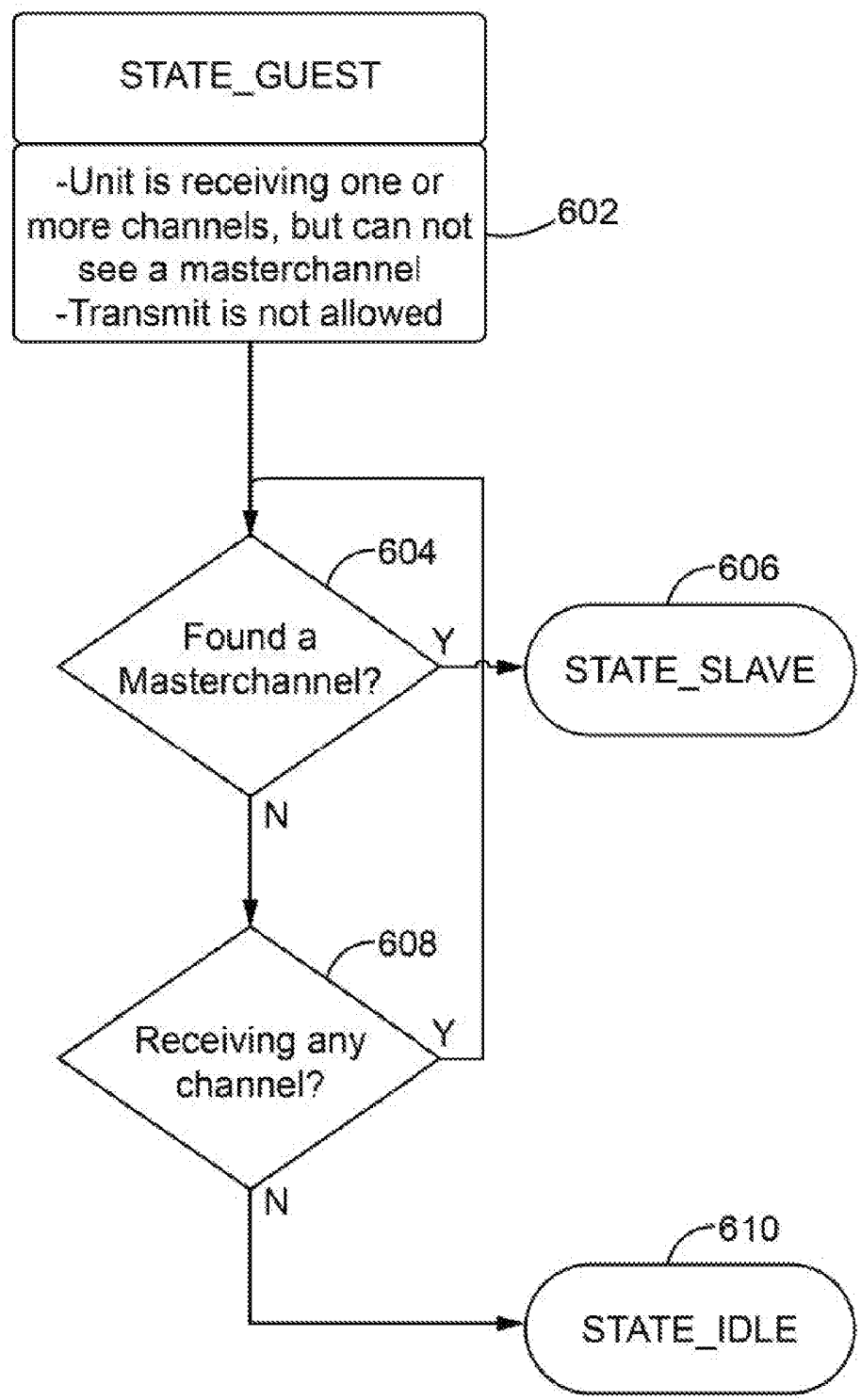
FIG. 6 is a flow chart depicting a portion of the example communication process, in accordance with one or more techniques of the present disclosure.

FIG. 6 shows a flow chart depicting a portion of the process of a device in the guest state, according to various embodiments. A communication device in the guest state 602 can receive communication data from other communication devices in the network, but is unable to (while in the guest state) send communication data to other devices.

A communication device in the guest state can determine if another communication device is in the master state 604. If the communication device finds a different communication device in the master state, the communication device can enter the slave state 606. If the communication device does not find a different communication device in the master state, the communication device can determine if it is receiving communication data 608. If it is receiving communication data, the communication device can receive the data and remain in the guest state. If the communication device is not receiving any communication data, the communication device can enter the idle state 610.

Figure 7:
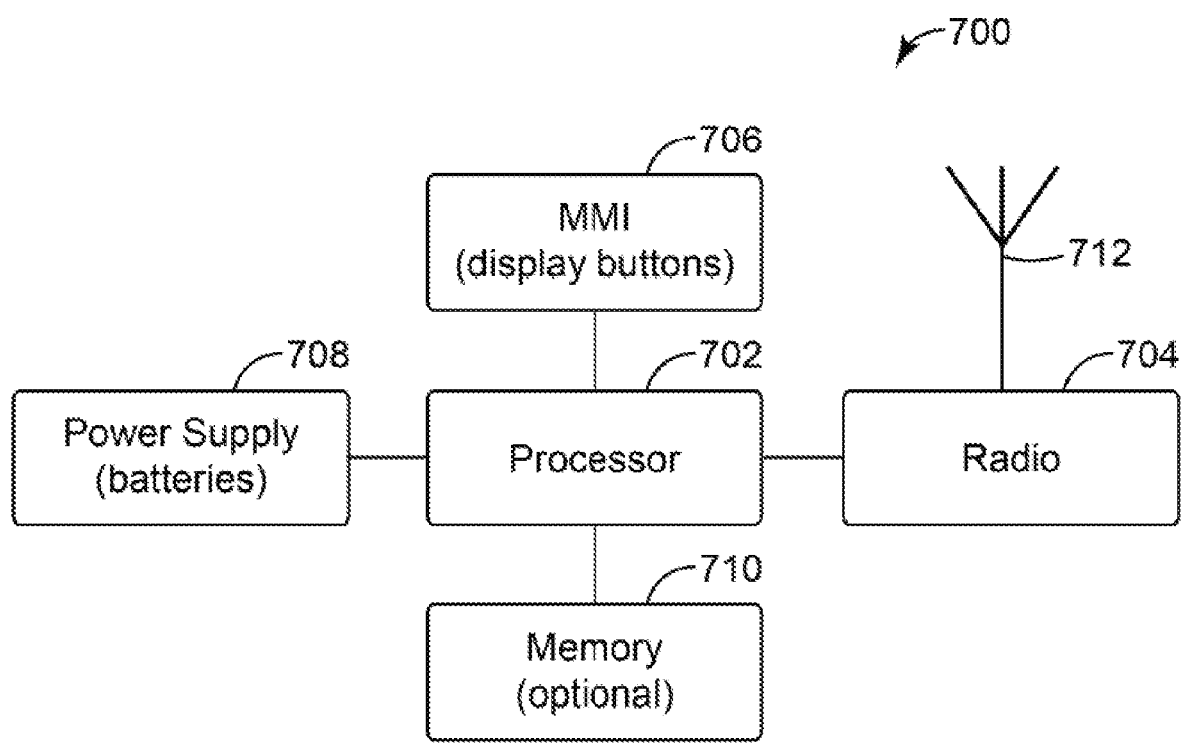
FIG. 7 is a schematic of portions of an example communication device, in accordance with one or more techniques of the present disclosure.

FIG. 7 shows a schematic of the electronic components of a communication device, according to various embodiments. The communication device can include an electronics package 700. The electronics package 700 can include a processor 702, such as an MCU or a CPU. The electronics package 700 can include a radio element 704. The radio element 704 can include an antenna 712. The radio element 704 can be configured to send and receive communication data to and from other devices. The electronics package 700 can include a user interface 706, such as a multimedia interface. The interface 706 can include buttons, a display screen or other components. The electronics package 700 can include a power supply 708, such as one or more batteries. In various embodiments, the electronics package 700 can include a memory element 710. In other embodiments, the memory element 710 can be included in the processor 702, such as when the processor 702 includes an MCU.

The distance/volume relationship described can be used with the other features that enable the network to operate without a base station and have only one master device at a time. The ability to fade the audio volume supports the "one master only" aspects of the network's design, since the radio range of the system is much greater than the audible range of the human ear. As a result, the devices have a margin of error to repair or restructure the network before anything is heard. For example, if there happens to be two masters, due to intermittent interference or simply that both master devices started to transmit too far away and therefore out of range of each other, and they move into each other's range, there is risk that there are several units transmitting on the same channel. If there is such channel collision, it will not be heard, and devices will have a chance to change the channel by the time that the users of the two devices get close enough that the audio would be heard. The existence of the guest state is also a way to reduce the risk of getting multiple masters, since as soon as a communication device sees a slave it will not allow transmission, which by definition also disallows becoming a master.

In various embodiments, the network is a full duplex communication system, where a communication device can simultaneously receive and transmit data.

As described above, in certain situations, groups of users (e.g., groups of users 110, 120, and/or 130 shown in FIG. 1) may work or otherwise be located in loud or noisy environments, such as certain manufacturing or shipping facilities. In these types of environments, the users may be required to wear personal protective equipment, such as hearing protection headsets, respirators, masks, or other similar equipment. In many cases, one or more users may wish to communicate with each other, and thus the personal protective equipment may include one or more communication devices (e.g., communication device 100 shown in FIG. 1, communication device 200 shown in FIG. 2) that enable the users to wirelessly communicate audio data while they wear the equipment in loud or noisy environments. Because the communication devices are configured to communicate audio data with other such communication devices in a wireless network, users are able to communicate while moving freely and independently within their work environments.

Because there are often many different groups of users within any given work environment, a particular communication device worn by a user may need to communicate with any number of different communication devices that are in proximity to the user. Groups of proximate devices may form local communication networks, such that the users of these devices may wirelessly communicate with one another. However, these communication devices may need to synchronize with one another in order to provide quality voice communication between devices, particularly given that the users of these devices are often mobile and may move around their environment frequently. Various techniques of the present disclosure enable a communication device to synchronize with other devices within a wireless communication network, thereby enabling any device to seamlessly join the network without additional configuration, and to become a full-fledged member of any given group. The techniques described herein enable users to more easily communicate even in loud or very noisy environments.

To achieve such synchronization, various techniques described herein provide a beacon system that improves wireless audio communication between communication devices that may be worn by users in these types of environments. As noted above, these communication devices (e.g., communication device 100 in FIG. 1, communication device 2 in FIG. 2) may be part of or included in the personal protective equipment worn by the users, and the use of these devices may allow the users to communicate or otherwise interact in a more natural way, as if they were not necessarily wearing any hearing protection. The described beacon system assists with the management of the wireless audio communication between the communication devices via a wireless communication protocol, which may be referred to as a Natural Interaction Behavior (NIB) protocol due to its ability to enable users working in noisy environments to communicate in a more natural way. The NIB protocol may be based on the Time Division Multiple Access (TDMA) radio communication protocol.

Through the use of the beacon system, the various communication devices are configured to more effectively synchronize with one another within the wireless communication network, thereby enabling any device to seamlessly join the network without additional configuration and to become a full-fledged member for purposes of audio communication with other devices in the network. The wireless NIB protocol enables wireless full duplex voice conferencing functionality without the use of a base station, and the protocol implements a number of dynamically allocated and reusable virtual communication channels, including one dedicated channel that is used for implementing the beacon system.

The NIB protocol is, in various examples, characterized as a baseless, connectionless, broadcasting single-hop mesh protocol that may implement TDMA to create these virtual communication channels. In certain non-limiting examples, the NIB protocol uses eight virtual channels, one of which is a dedicated channel used for the beacon system described herein. The remaining seven channels are used for communicating audio communication data between devices. The NIB protocol may assign and release the seven audio channels dynamically, similar to the techniques described above regarding the dynamic allocation of time slots. If a particular communication device requests audio transmission, the first available channel will be assigned for this transmission, and all other communication devices are allowed to receive the transmission.

In various examples, the NIB protocol is connectionless. As a result, an unlimited number of listening communication devices can be part of the communication network. As noted above, the communication devices that utilize NIB protocol may not interact with a base station, such that the devices are capable of communicating directly with one another in the network with the use of a central management entity, and where all communication devices in the network may be deployed as equivalent entities. The NIB protocol may include or otherwise utilize a positioning system based on the distance between communication devices, such as described above. For example, a communication device may measure the received signal strength of received signals from remote communication devices. The communication device may locally output received audio with a higher strength or volume for received signals received from a proximate remote communication device, but may fade or decrease the volume as this remote communication device moves farther away, such as previously described above. This approach enables a voice-activated switch type operation without any requisite manual intervention. This approach also enables users of communication devices to hear only audio from proximate users. For instance, remote devices of users located thirty feet away from a communication device may still be in radio coverage, but the communication device may not output audio received from these remote devices via the local speaker if it determines that thirty feet is beyond a threshold proximity distance from the communication device.

The NIB protocol does not, in various examples, have any frequency hopping. Instead, the protocol uses one physical channel or frequency, which may be configurable. In addition, communication devices that utilize the NIB protocol may, in many instances, not need any on-site or in-the-field configuration. When desired, any new device can join the network without any configuration and become a full-fledged member of the network. The NIB protocol may also provide a very low and fixed latency for data communications.

Figure 8:
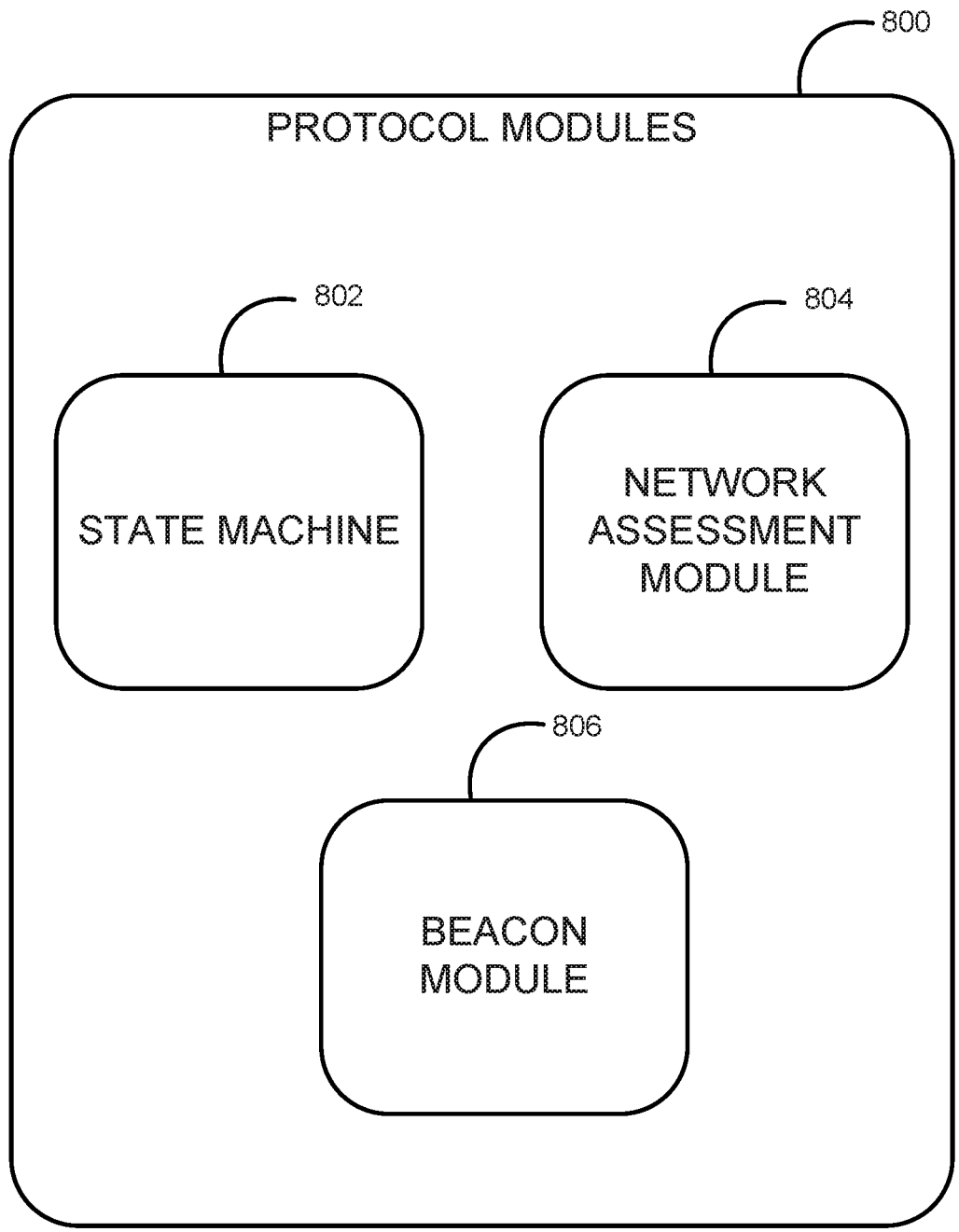
FIG. 8 is a conceptual view of example components of a protocol module that may be implemented by a communication device, in accordance with one or more techniques of the present disclosure.

FIG. 8 is a conceptual view of example components of protocol modules 800 that may be implemented by a communication device (e.g., communication device 100 in FIG. 1, communication device 200 in FIG. 2), in accordance with one or more techniques of the present disclosure. For example, the local communication device may comprise a headset communication device that includes a first ear cup, a second ear cup coupled to the first ear cup (e.g., with a headband), and a speaker that is configured to output sound waves, where the speaker may be disposed in one or more of the first ear cup or the second ear cup.

Protocol modules 800 may be implemented by any given communication device for wirelessly communicating data via a communication protocol (e.g., NIB protocol) with one or more remote communication devices. For example, protocol modules 800 may be implemented by a headset communication device that is configured to communicate with one or more remote headset communication devices within a work environment. Each headset communication device may be associated with a respective worker within the work environment and may be configured to communicate using a wireless communication protocol to enable wireless voice conferencing between the workers without use of a base station. As non-limiting examples, a headset communication device may be included in a welding mask, respiration mask, or a hearing protection headset.

As shown in FIG. 8, protocol modules 800 include a state machine 802, a network assessment module 804, and a beacon module 806. State machine 802 receives information from beacon module 806 and network assessment module 804 and traverses the local communication device through different states with different system rights. For example, transmission of local audio communication data via one or more virtual communication channels may only be allowed from the local communication device if a number of conditions are met. State machine 802 is responsible for transitioning into the correct state based on information reported by network assessment module 804 and beacon module 806. Using protocol modules 800, the local communication device attempts to transmit local audio communication data only at the right times (e.g., when synchronized with one or more remote communication devices), on the correct virtual channel/slot, and when it is allowed to transmit (e.g., when the network is deemed stable), as shown in greater detail in FIG. 13.

Network assessment module 804 analyses the network, based on local and received information, and creates a configuration of the network. Network assessment module 804 may determine, for each virtual channel, whether the channel is active or free at a given point in time. In some cases, network assessment module 804 may provide a software implementation of a re-triggerable monostable circuit to ensure that, once a packet is received on a given virtual channel, that virtual channel is flagged as active. However, after a certain period of time of not receiving any packets on that channel, network assessment module 804 will flag the channel as free once again.

Network assessment module 804 may also implement a positioning system that determines the distance between the local communication device and remote devices. Audio data received by the local communication device implementing or executing protocol modules 800 is decoded and mixed into the audio playback at the speakers of the local communication device, if they are received by a proximate remote communication device, as determined by network assessment module 804 (e.g., using indications of received signal strength indications). The use of received signal strength indications may provide an estimate of the distance between the local communication device and one or more remote devices. In some examples, the received signal strength for each incoming packet received by the local communication device on a given virtual channel may be smoothed in a simple moving average filter, and the resulting value may be used as an input or index into a look-up table that provides, as output, corresponding gain values for the output audio signal (e.g., volume), such as described previously. In some cases, looking up the gain values directly may provide savings to computing power in the local computing device.

In various examples, network assessment module 804 is responsible for reporting reliable information about the communication network between the local communication device and remote devices to state machine 802. Even in a single hop mesh network, various things can potentially go wrong with the network. The incoming information received by a local communication device may contain metadata or other information about the network, and this information may, in some cases, be unreliable due to one or more issues, including but not limited to (1) corrupt packets (e.g., if burst of radio interference destroys a portion of a packet, (2) lost packets (e.g., if remote device becomes out of range), (3) correct packets with erroneous data (e.g., if remote device has sent erroneous data), (4) old packets (e.g., if a packet has been buffered and not handled in time), and/or (5) unreliable received signal strength information (e.g., due to continued or erratic movements of remote communication devices). Network assessment module 804 attempts to manage and identify these types of issues in order to provide the most accurate and up-to-date network status information it can to state machine 802, and to identify if there are any problems with the communication network.

In various cases, network assessment module 804 may detect anomalies or errors in the communication network and report these to state machine 802. State machine 802 may process such detected anomalies or errors as events associated with a bad network connection. There are various distinct situations that can be reliably detected as anomalies or errors in the network. For example, network assessment module 804 may determine a bad-packets-rate by counting the number of bad packets received per second, where a bad packet may be defined as a packet that was received by but that has a faulty cyclic redundancy check (CRC) code.

Network assessment module 804 may also detect channel collision for data communicated by a local communication device and one or more remote devices. For example, if a local communication device receives a packet containing information indicating a virtual channel on which the local device also transmits, network assessment module 804 may identify an instance of potential channel collision. In addition, network assessment module 804 identify situations in which the radio hardware of a local communication device has locked up and/or become non-functional. In any of these example instances, network assessment module 804 may determine that one or more network anomalies or errors exist, and report such information to state machine 802. State machine 802 may then process such information as one or more events associated with a bad network connection between the local communication device and one or more remote devices.

Beacon module 806 is responsible for synchronizing the local communication device with remote communication devices in the network. For example, beacon module 806 may be responsible for synchronizing the timing across the network, and may, in some cases, also provide an auxiliary function of monitoring the radio hardware of the local device for malfunction.

Figure 9:
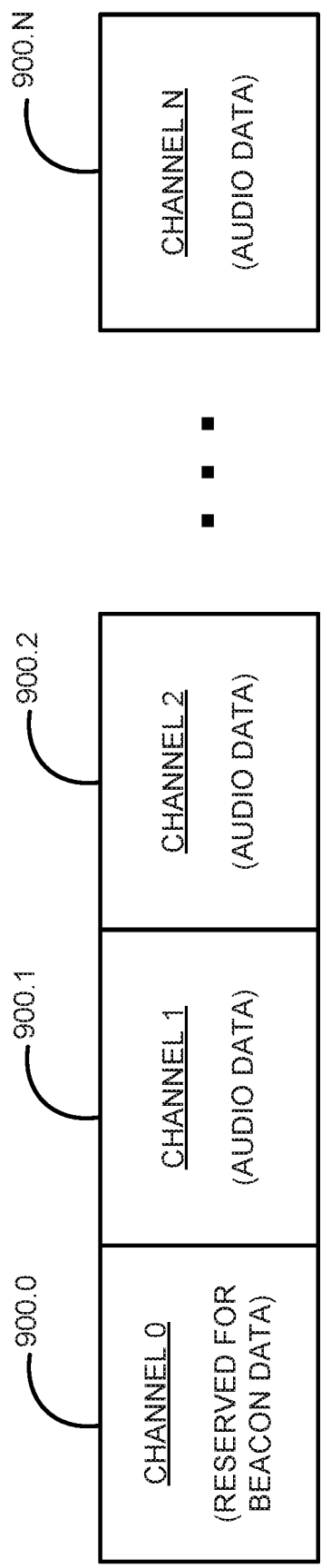
FIG. 9 is a conceptual view of example virtual communication channels that may be utilized by a wireless communication protocol to exchange data between communication devices, in accordance with one or more techniques of the present disclosure.

In various examples, beacon module 806 may cause the local communication device implementing protocol modules 800 to transmit a short beacon, or local beacon data, once every period of time (e.g., every beacon interval), such as once every second. The beacon interval may define an amount of time between local beacon data that is transmitted by the local communication device. Beacon module 806 may transmit this beacon using a dedicated virtual channel (e.g., virtual channel 0, such as shown in FIG. 9) of the wireless protocol, and may include identification information within the beacon (e.g., the serial number of the communication device that sends the beacon). This particular virtual channel may be exclusively dedicated for beacon transmissions by all communication devices in the communication network. Each communication device in the network is configured to periodically transmit respective local beacon data on the dedicated virtual channel, based on the beacon interval, and each communication device is also configured to listen for and process incoming beacons, or remote beacon data, from other remote communication devices on the same dedicated virtual channel during a discovery process.

Because, in various examples, all communication devices in the network utilize the same dedicated virtual channel for transmitting beacon data, the various communication devices are configured to transmit such signals at various different points in time from one another, to avoid potential collisions or overwriting of the information contained in the beacon data. For example, each communication device may be configured to attempt to transmit a beacon on the dedicated channel once every beacon interval (e.g., once every second), at a time when no other communication device is also transmitting a beacon.

Figure 11:
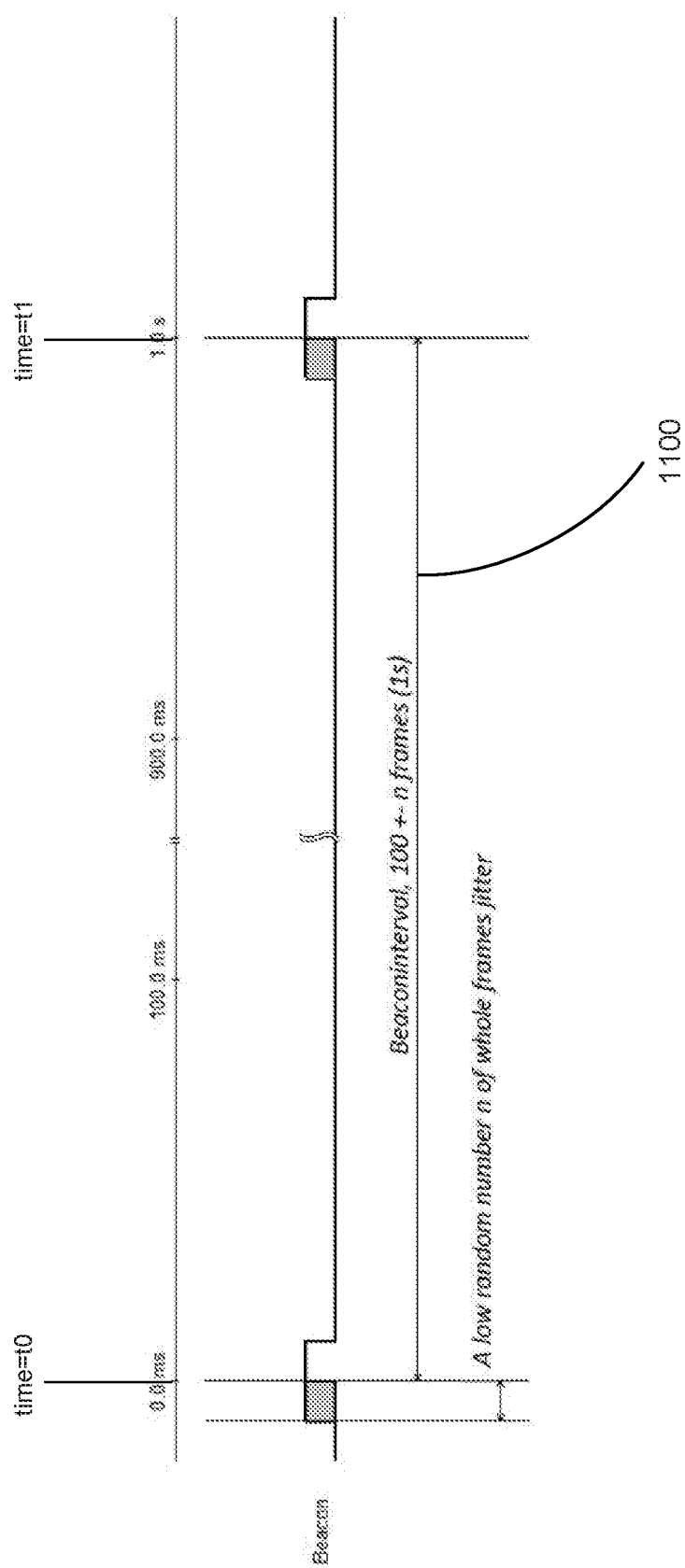
FIG. 11 is a conceptual view of an example beacon that is transmitted from a communication device via a wireless communication protocol, in accordance with one or more techniques of the present disclosure.

In some examples, each communication device may be configured to transmit beacon data once every beacon interval, but at times that are slightly offset from times at which other communication devices also transmit their respectively beacon data, in order to avoid communication devices transmitting beacons at the exact same time. For instance, each communication device may calculate a small random offset (e.g., positive or negative offset, or jitter) at which to transmit its local beacon, as will be described in further detail below. Each communication device is configured to transmit its local beacon data and to receive remote beacon data from remote communication devices. In some non-limiting examples, the small random offset may be a random offset (e.g., positive or negative offset, or jitter) anywhere in the range of one to three whole frames of data, such as illustrated in FIG. 11 and described in more detail below, where each frame is equal to 10 milliseconds. In some non-limiting examples, the small random offset may be a random offset in the range of one to six whole frames of data.

In certain examples, one or more of the communication devices may calculate the offset at which to transmit local beacon data using a non-randomized, deterministic approach. In these examples, the one or more communication devices may implement such a deterministic approach for calculating the amount of offset (e.g., positive or negative number of whole frames of data) for each instance of local beacon data that is transmitted. Thus, the techniques described herein are not limited to a randomized approach for calculating offset values.

Any given communication device may not be allowed to participate in the network or transmit audio data until it has discovered at least one remote beacon transmitted by a remote device, and deemed the network stable for a certain amount of time. State machine 802 of each communication device determines the current state of the device and whether or not the device is allowed to actively participate in the network or transmit audio data. Once a local communication device has synchronized with at least one other remote device, the local communication device is configured to receive remote audio communication data from the at least one remove device. Furthermore, once the network is deemed stable, the local communication device is configured to transmit its local audio communication data to the at least one remote device.

In various examples, beacon module 806 implements a network synchronizing mechanism that is configured to directly synchronize to the communication device in the network that has the lowest serial number. As described above, in various cases, beacon data transmitted by a communication device may include the serial number of that device. Upon receiving remote beacon data from one or more remote communication devices, a local communication device will identify the serial numbers of these one or more remote communication devices, which are included in the respective beacon data received from these remote devices. The local communication device will then compare these serial numbers to its own local serial number to determine a lowest overall serial number. If the lowest overall serial number is associated with a particular one of the remote communication devices, the local communication device will synchronize its internal clock or local time counter used that control data communication (e.g., internal TDMA timing) to match the clock or remote time counter of this particular remote communication device, as indicated by the timing of the received beacon from this particular remote communication device. The local communication device may then transmit local audio communication data to remote devices based on this reset clock or local time counter. If, however, the lowest overall serial number is the local communication device's own local serial number, the local communication device will not synchronize to any of the remote devices, and will instead maintain its current clock timing.

In certain examples, the wireless protocol (e.g., NIB protocol) may be mapped to the Open Systems Interconnection (OSI) stack as follows. State machine 802, which may manage the states for the virtual channels, along with the transmission and reception of data by the local communication device, may be mapped to the OSI session layer. Network assessment module 804, which may provide data integrity functionality, may be mapped to the OSI transport layer. Beacon module 806, which may provide network synchronization functionality, may be mapped to the OSI network layer. The radio hardware equipment of the local communication device may be mapped to the OSI data link and physical layers. The audio codec of the local communication device, which provides functionality for the compression and decompression of audio data, may be mapped to the OSI presentation layer. And, the audio management system of the communication device, which provides functionality for recording of audio for transmission, as well as mixing and playback of received audio, may be mapped to the OSI application layer.

FIG. 9 is a conceptual view of example virtual communication channels that may be utilized by a wireless communication protocol, such as the NIB protocol described above, to exchange data between communication devices, in accordance with one or more techniques of the present disclosure. FIG. 9 illustrates an example of virtual communication channels, or slots, labelled 900.0 through 900.N (collectively, "virtual communication channels 900). The wireless protocol may implement any number of these different virtual communication channels, which are analogous to the communication slots described previously. As outlined above, communication devices in the communication network may wirelessly exchange data, such as communication packet data shown in FIG. 10, using the virtual communication channels of the wireless communication protocol. One of these channels may be exclusively dedicated for the communication of beacon data for use by beacon module 806 shown in FIG. 8. As shown in the example of FIG. 9, virtual communication channel 900.0 ("Channel 0") may be reserved for the communication of beacon data.

Each communication device in the network (e.g., using its respective beacon module 806) may periodically transmit beacon data (e.g., one beacon every beacon interval) using dedicated virtual communication channel 900.0, and each communication device in the network may also monitor for the receipt of incoming beacon data, sent from other communication devices, using the same dedicated virtual communication channel 900.0. However, the different communication devices may transmit respective beacon data at different times, as noted above and as will be described in further detail below. Each communication device may also utilize any of the remaining virtual communication channels 900.1 (Channel 1) through channel 900.N (Channel N) for transmitting audio data to other communication devices.

As described previously regarding the dynamic allocation of slots, virtual communication channels 900.1 through 900.N may similarly be dynamically allocated to communication devices based on their availability. Accordingly, virtual communication channels 900.1 through 900.N may be considered dynamically allocatable and reusable channels. Virtual communication channels 900.1 through 900.N may be allocated to a communication device for transmission of audio data based on the first available or free channel, according to the allocation and release history of these channels. A communication device (e.g., using network assessment module 804 shown in FIG. 8) may determine a first available virtual communication channel from channels 900.1 through 900.N, where the first available virtual channel is currently unused for data transmission by other communication devices in the network. The communication device may then transmit local audio communication data to other remote devices using this available channel. Each communication device is also configured to listen for incoming audio data received from other remote communication devices on one or more of virtual communication channels 900.1 through 900.N.

FIG. 10 is a conceptual view of an example communication packet 1010, in accordance with one or more techniques of the present disclosure. Any of the communication devices within a wireless communication network may wirelessly transmit or receive one or more communication packets, such as communication packet 1010, via one or more virtual communication channels (e.g., one or more of virtual communication channels 900 shown in FIG. 9) of the NIB protocol described above.

As shown in FIG. 10, communication packet 1010 may include various information, such as virtual channel information 1012, beacon data 1016, and audio data 1022. In some non-limiting examples, communication packet 1010 may be thirteen bytes in length. Communication packet 1010 may be clocked in from the radio chip of a local communication device that receives communication packet 1010, or may be clocked out to the radio chip when the local communication device requests outgoing transmission of communication packet 1010 to remote devices.

Virtual channel information 1012 may include certain information about the virtual channel on which communication packet 1010 is transmitted. Virtual channel information 1012 may be used by a local communication device to separate each incoming audio stream or beacon information that is sent from a remote communication device, and may also be used by network assessment module 804 to detect channel collisions as a possible error or bad network condition. For example, if a local communication device is using virtual communication channel 900.1 (Channel 1) to transmit audio data, and it receives virtual channel information 1012 having the identifier for virtual communication channel 900.1, indicating that the remote communication device that sent communication packet 1010 has included audio data on the same virtual communication channel 900.1, network assessment module 804 of the local communication device will identify a channel collision on this channel. However, as noted previously, in various examples, all communication devices may send and receive beacon data on the same virtual channel (e.g., virtual communication channel 900.0 shown in FIG. 9), so network assessment module 804 may not identify any channel collision for received beacon data included in beacon data 1016 of communication packet 1010.

Beacon data 1016 includes beacon information that is used by beacon module 806 for purposes of synchronization. In non-limiting examples, beacon data 1016 includes the serial number of the communication device that has transmitted beacon data 1016. As described above, in various examples, beacon module 806 implements a network synchronizing mechanism that is configured to directly synchronize to the communication device in the network that has the lowest serial number. Each communication device more store a value identifying the lowest overall serial number of the communication device to which it is synchronized. Initially, when a local communication device first is powered on, the local communication device may store its own serial number as this lowest overall serial number, as it has not yet received any beacon data from remote devices.

Upon receiving beacon data from a remote communication device, the local communication device will identify the serial number of the remote communication device that is included in beacon data 1016 of the communication packet 1010 that is received from the remote communication device. The local communication device then determines whether this received serial number is higher or lower than the stored lowest overall serial number. If the serial number of the remote communication device is lower than this stored serial number, the local communication device will synchronize its internal clock to match the clock of the remote communication device as indicated by the timing of receiving beacon data 1016 in communication packet 1010, and will also update its stored value of the lowest overall serial number to that of the remote communication device. If, however, the serial number of the remote communication device is higher than the lowest overall serial number currently stored by the local communication device, the local communication device will not synchronize to the clock of the remote device. In such fashion, any time the local communication device receives new beacon data 1016 from a remote communication device, it is capable of comparing the received serial number to the currently stored lowest overall serial number value to determine whether or not to synchronize to the remote communication device (e.g., when the received serial number is lower than the currently stored value of the lowest overall serial number).

Audio data 1022 may include audio data, such as, for example, compressed audio data for the duration of one frame (e.g., a 10 ms frame). In some cases, communication packet 1010 may include additional information, such as an indicator that may be used for broadcasting emergency messages to override the distance-volume fade out mechanism and trigger playback of the audio with full volume in any situation, regardless of the distance between communication devices. In some examples, a communication device (e.g., using its internal radio chip) may encapsulate example communication packet 1010 shown in FIG. 10 by adding additional data that may be used for transmission of communication packet 1010 over the air.

FIG. 11 is a conceptual view of example beacon data that is transmitted from a communication device via a wireless communication protocol, such as the NIB protocol, in accordance with one or more techniques of the present disclosure. As described previously, every communication device is configured to transmit beacon data using the dedicated virtual communication channel (e.g., reserved channel 900.0 shown in FIG. 9), where each device may transmit beacon data once every beacon interval 1100 period of time. However, since each communication device uses the dedicated virtual communication channel for beacon transmission, in order to avoid possible collisions, each communication device may be configured to transmit is respective beacon data at a different time from the other communication devices in the network.

In non-limiting examples, such as shown in FIG. 11, one beacon interval 1100 is one second in length and may include one hundred frames. Beacon interval 1100 is the nominal time between transmission of beacon data, and each communication device may be configured to transmit respective beacon data once every beacon interval 1100. Thus, in the example of FIG. 11, any given communication device is configured to periodically transmit a beacon once every second, or every one hundred frames. To avoid two or more communication devices continuously transmitting their beacons at the same time, each individual communication device may, in the example of FIG. 11, compute a low random number of frames that are used as an offset to a beginning of each occurrence of beacon interval 1100. This low random number of frames may be referred to as jitter with respect to beacon interval 1100.

As an example, without the use of the random offset, each individual communication device may transmit a beacon at time t0=0.0 millisecond (ms), time t1=1.0 second, and the like, as indicated in FIG. 11. In this example, beacon interval 1100 is one second and includes one hundred frames, such that each frame is 10 ms. However, if every communication device transmitted a beacon at times t1, t2, and the like, there may be collisions of beacon signals on the dedicated virtual communication channel. As a result, each communication device may compute a low random number of frames that are used as a positive or negative offset from time=t0 (e.g., a positive or negative offset to a beginning of each occurrence of beacon interval 1100).

In the example of FIG. 11, a particular communication device may calculate a low random number "n" of whole frames jitter, where "n" may be a positive or negative whole number, such that the particular communication device may use low random number "n" as either a positive or negative offset from time=t0. For instance, if low random number "n" is negative two, the communication device may transmit a first beacon at time=t0 minus two frames (e.g., t0 minus 20 ms), and may transmit a second beacon at time=t1 minus two frames (e.g., t1 minus 20 ms), where beacon interval 1100 remains at one second.

As another example (not shown in FIG. 11), a different communication device may calculate a low random number "n" of positive three. In this case, the communication device may transmit a first beacon at time=t0 plus three frames (e.g., t0 plus 30 ms), and may transmit a second beacon at time=t1 plus three frames (e.g., t1 plus 30 ms), where beacon interval 1100 remains at one second. In some non-limiting examples, the low random offset may be a random offset (e.g., positive or negative offset) anywhere in the range of one to three frames of data. In some non-limiting examples, the low random offset may be a random offset in the range of one to six frames of data.

Thus, to avoid potential collisions between beacons that are transmitted by different communication devices over time, each individual communication device may compute its own low random number of frames that are used as either a positive or negative frame offset for beacon interval 1100, as indicated in FIG. 11.

Figure 12:
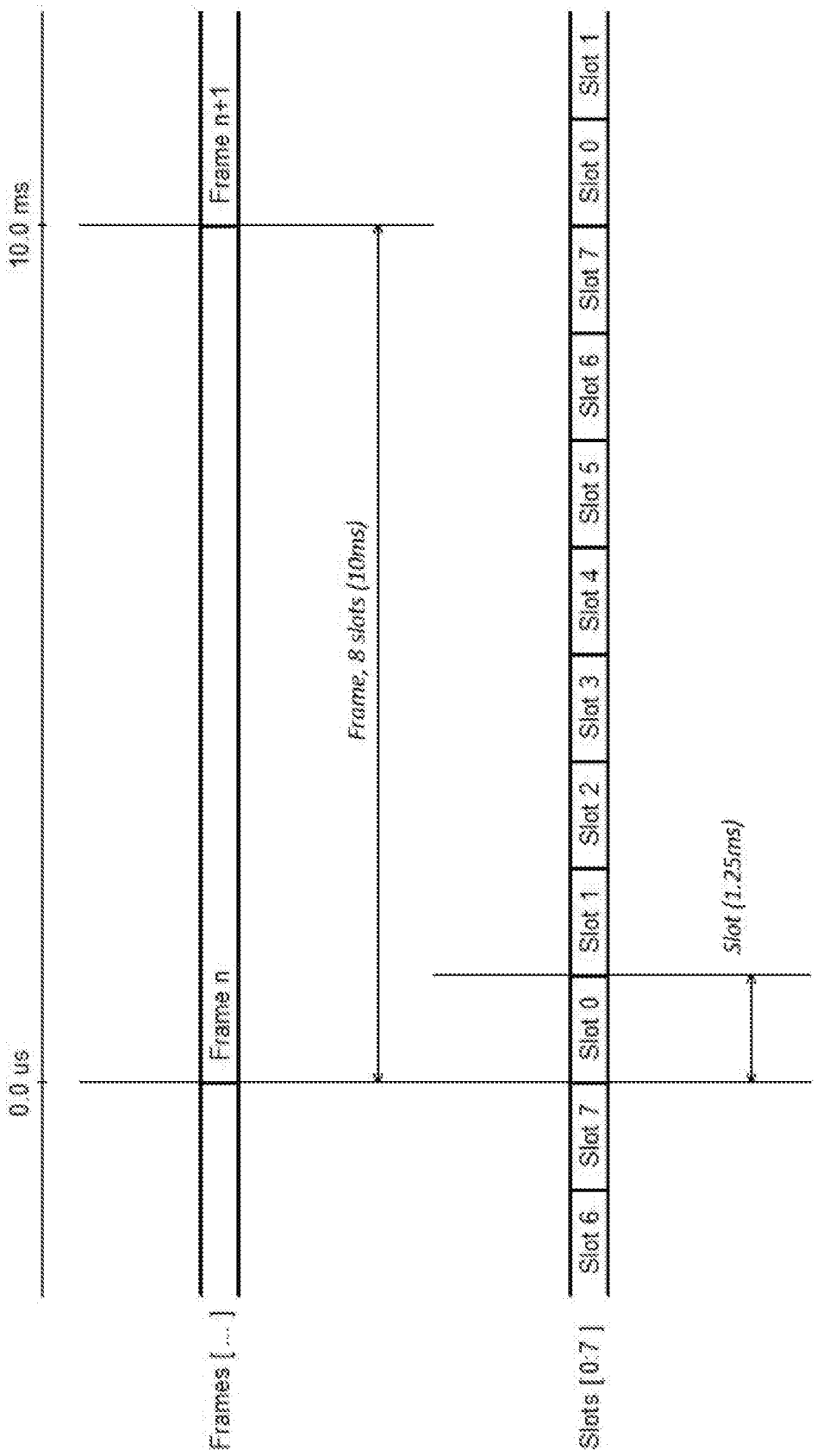
FIG. 12 is a conceptual view of example frames and slots utilized by a wireless communication protocol, in accordance with one or more techniques of the present disclosure.

FIG. 12 is a conceptual view of example frames and slots utilized by a wireless communication protocol, in accordance with one or more techniques of the present disclosure. In the example of FIG. 12, as in the example of FIG. 11, any given frame is 10 ms long, and each frame may include eight slots. Each of the eight slots corresponds to a respective virtual communication channel. One of the slots is reserved for use by the dedicated virtual communication channel that is used for beacon transmission, and the remaining seven slots may be used for seven different virtual communication channels that are used for transmission of audio data. As described previously, each of the seven slots may be dynamically assigned and reused over time by communication devices, and any particular communication device may utilize one or more of these slots over time for communicating audio data via a respective virtual communication channel. In normal operation, each communication device may both receive and transmit simultaneously, but using different time slots.

Using the example of FIG. 9, where there are a total of eight virtual channels, channel 900.0 may be reserved as the dedicated channel for beacon transmission, and channels 900.1 through 900.7 may be used for audio data communication by respective communication devices. In this case, and in reference to FIG. 12, dedicated virtual channel 900.0 may be assigned to Slot 0, audio virtual channel 900.1 may be assigned to Slot 1, audio virtual channel 900.2 may be assigned to Slot 2, audio virtual channel 900.3 may be assigned to Slot 3, audio virtual channel 900.4 may be assigned to Slot 4, audio virtual channel 900.5 may be assigned to Slot 5, audio virtual channel 900.6 may be assigned to Slot 6, and audio virtual channel 900.7 may be assigned to Slot 7. Each individual frame, which is 10 ms in duration, includes fields for Slots 0 through 7, and each of these slots may include respective beacon or audio data. Each individual slot is 1.25 ms in duration.

Figure 13:
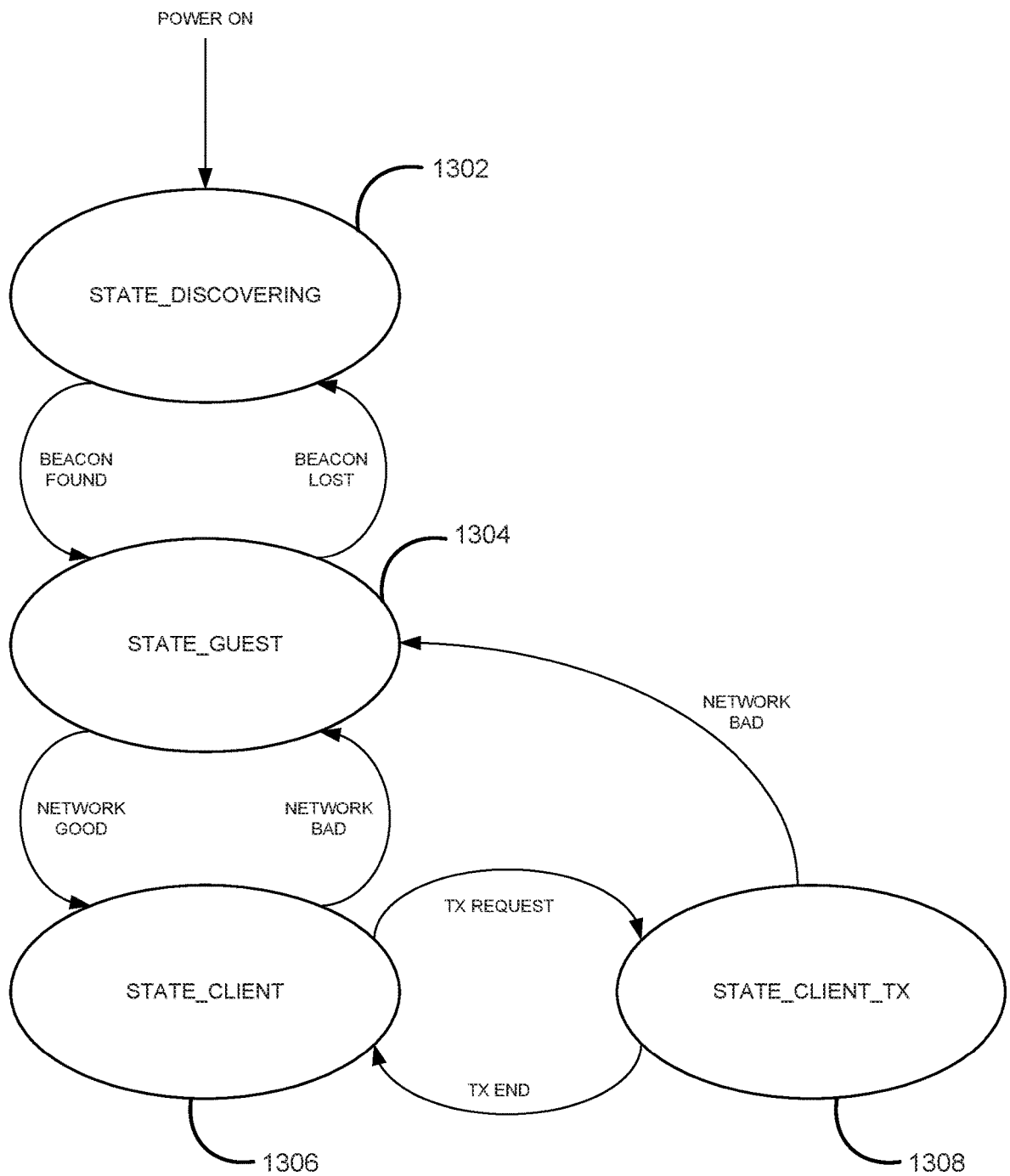
FIG. 13 is a state transition diagram illustrating example states and state transitions for communication by a communication device, in accordance with one or more techniques of the present disclosure.

FIG. 13 is a state transition diagram illustrating example states and state transitions for communication by a communication device, in accordance with one or more techniques of the present disclosure. State machine 802 of protocol modules 800, as illustrated in FIG. 8, may provide the states and state transitions illustrated in the example of FIG. 13. Any of the communication devices in the communication network may implement state machine 802, which may control transmit and/or receive operations of the respective communication device.

State machine 802 is responsible for transitioning into the correct state based on information reported by one or more other subsystems, such as one or more of other protocol modules 800 shown in FIG. 8. State machine 802 is configured to transmit communication data at appropriate times (e.g., when the communication device is synchronized), on the correct virtual channel or slot, and when the communication network is deemed stable. Received packets are decoded and mixed in to the audio playback system if the receiving communication device is deemed sufficiently close in distance to the communication device that transmitted the packets, according to various examples (e.g., as managed by network assessment module 804, described previously).

Initially, a local communication device implementing state machine 802 may be powered on, which transitions state machine 802 to the discovering state 1302 ("STATE_DISCOVERING"). The local communication device may determine its local serial number, which may be programmed by manual configuration and/or may be stored in local memory of the communication device. As described previously, the local communication device may store a value of an overall lowest serial number, for purposes of synchronization via beacon module 806. Initially, after power up, the local communication device may store its own serial number as the overall lowest serial number.

Discovering state 1302 may be considered as the power-on and initial default state. In discovering state 1302, beacon module 806 may transmit beacon data from the local communication device once every beacon interval, as described previously. In non-limiting examples, the beacon interval may be one second. Audio transmission is not yet allowed in discovering state 1302, since state machine 802 has not yet received an assessment of the communication network from network assessment module 804 at this stage. In discovering state 1302, beacon module 806 also monitors for the receipt of beacon data transmitted from one or more other remote communication devices.

If beacon module 806 identifies received beacon data from a remote communication device in discovering state 1302, the local communication device determines whether or not to synchronize its time counter to that of the remote communication device as indicated by the received beacon data, to reset the transmit timing to match that of the remote communication device. In non-limiting examples, and as described previously, the local communication device may synchronize with the remote communication device if the serial number of the remote communication device, included in the received beacon data, is lower than the current value of the overall lowest serial number stored by the local communication device, and may then reset its time clock to match that of the remote communication device as indicated by the received beacon data. In this case, the local communication device also updates the value of the lowest overall serial number to match the serial number of the remote communication device. If, however, the serial number of the remote communication device is higher than the currently stored value of the overall lowest serial number, the local communication maintains its time counter and does not synchronize to the remote communication device. In any case, upon receiving remote beacon data, state machine 802 may receive a corresponding event (e.g., "BEACON FOUND" event shown in FIG. 13) from beacon module 806, causing state machine 802 to transition to a guest state 1304 ("STATE_GUEST").

In guest state 1304, the local communication device is capable of receiving audio communication data from one or more remote communication devices. Incoming communication data (e.g., communication data that includes communication packet 1010 shown in FIG. 10) may arrive from one or more remote communication devices at any time in guest state 1304, so the local communication device (e.g., application firmware for sampling, mixing, playback, and the like) is configured to asynchronously handle received data.

As described previously, in various examples, the local communication device may comprise a headset communication device, such as device 200 shown in FIG. 2. In these examples, the local communication device may include a first ear cup, a second ear cup coupled to the first ear cup (e.g., with a headband), and a speaker that is configured to output sound waves, where the speaker may be disposed in one or more of the first ear cup or the second ear cup. While in a state in which the local communication device is able to receive incoming audio data (e.g., guest state 1304), the local communication device may receive, via one or more virtual communication channels and from a remote communication device, remote audio communication data. In order to determine a volume (e.g., fade in/out volume) at which to output sounds associated with the received data at the speaker, such as described previously, the local communication device may, in certain examples, determine a distance between the local communication device and the remote communication device, determine a volume level based on the distance, and then provide, for output at the speaker at the determined volume level, the received remote audio communication data. If the determined distance is greater than or equal to a threshold distance, the local communication device may set the volume level at zero. In various cases, the determined distance and corresponding volume settings are based on a received signal strength indicator associated with the remote audio communication data, such as described previously.

At any point in time while state machine 802 is in guest state 1304, in the case where the local communication device has previously synchronized with a remote communication device, if beacon module 806 fails to receive further or subsequent beacon data from this same remote communication device, beacon module 806 may determine that it has lost communication with this remote communication device, and may generate a corresponding event for state machine 802 (e.g., "BEACON LOST" event shown in FIG. 13), when it has not received further remote beacon data from this remote communication device over time. Upon processing this event, state machine 802 transitions from guest state 1304 back to discovering state 1302. In some cases, beacon module 806 may determine that it has lost such communication if it has failed to receive a defined number of consecutive beacons (e.g., five consecutive beacons) from the remote communication device, each separated by the beacon interval. Beacon module 806 may identify the remote communication device with which it has previously synchronized based on the currently stored value of the lowest overall serial number, which was stored by beacon module 806 when it previously received beacon data from the remote communication device. In discovering state 1302, the local communication device is disallowed from transmitting any local audio communication data to remote devices, and thus the local communication device refrains from transmitting any such data in this state. The local communication device may also be disallowed from processing any received remote audio communication data when state machine 802 is in discovering state 1302.

If, however, state machine 802 is in guest state 1304, and synchronization stays stable for a determined amount of time, network assessment module 804 may deem the communication network to be stable and may generate a corresponding event (e.g., "NETWORK GOOD" event shown in FIG. 13) for processing by state machine 802. In this case, state machine 802 transitions from guest state 1304 to a client state 1306 ("STATE_CLIENT"). In client state 1306, the local communication device is generally permitted to transmit audio communication data to remote communication devices. As shown in FIG. 13, however, the local communication device is not permitted to transmit such data until it reaches client state 1306. That is, the local communication device is not permitted to transmit in discovering state 1302 and guest state 1304.

As described previously, network assessment module 804 is capable of determining the stability (e.g., quality) of the communication network between the communication devices. The incoming information received by the local communication device may contain metadata or other information about the network, and this information may, in some cases, be unreliable due to one or more issues, including but not limited to (1) corrupt packets (e.g., if burst of radio interference destroys a portion of a packet, (2) lost packets (e.g., if remote device becomes out of range), (3) correct packets with erroneous data (e.g., if remote device has sent erroneous data, (4) old packets (e.g., if a packet has been buffered and not handled in time), and/or (5) unreliable received signal strength information (e.g., if this information normally varies over time due to the communication device being mobile). Network assessment module 804 attempts to manage and identify these types of issues in order to provide the most accurate and up-to-date information it can to state machine 802, and to identify if there are any problems with the communication network.

In various cases, network assessment module 804 may detect anomalies or errors in the communication network. State machine 802 may process such detected anomalies or errors as events associated with a bad network connection (e.g., "NETWORK BAD" event shown in FIG. 13). There are various distinct situations that can be reliably detected by network assessment module 804) as anomalies or errors in the network, such as those described previously (e.g., bad-packets-rate, channel collision, locked up and/or non-functional radio hardware).

If network assessment module 804 generates such an event while state machine 802 is in client state 1306, state machine 802 transitions back to guest state 1304. Once in guest state 1304, the local communication device will no longer be permitted to transmit audio communication data to remote communication devices. It will be prohibited from doing so until state machine 802 receives an event from network assessment module 804 indicating that the network is once again stable (e.g., "NETWORK GOOD" event), and then transitions back to client state 1306. In determining whether the network is stable or unstable (e.g., "NETWORK GOOD" or "NETWORK BAD"), network assessment module 804 may assess a quality of the communication network, and determine if the quality exceeds a defined threshold. This threshold may be based on a defined number of anomalies or errors in the network. If network assessment module 804 determines that the quality exceeds the threshold, it may determine that the network is stable (e.g., "NETWORK GOOD"), and, in response, that the local communication device may transmit local audio communication data (e.g., if state machine 802 is in client state 1306 or client transmit state 1308). If, however, network assessment module 804 determines that the quality of the network does not exceed the threshold, it may determine that the network is unstable (e.g., "NETWORK BAD").

While in client state 1306, at any time, the local communication device may receive a request to transmit data to one or more remote communication device. State machine 802 may receive an event from the audio management system of the local communication device (e.g., "TX REQUEST" event), and may transition from client state 1306 to a client transmit state 1308 ("STATE_CLIENT_TX"). While in transmit state 1308, network assessment module 804 may identify the first free or available virtual channel for use in transmitting the audio data (e.g., one of audio virtual communication channels 900.1-900.N shown in FIG. 9). The local communication channel may then start transmitting its local audio communication data using the identified channel. At the end of transmission, and upon processing of a corresponding event (e.g., "TX END" event), state machine 802 may transition from client transmit state 1308 and back to client state 1306, awaiting further transmit requests. However, if at any time while in client transmit state 1308, if state machine 802 receives an event from network assessment module 804 indicating a bad or unstable network (e.g., "NETWORK BAD" event), state machine 802 will transition back to guest state 1304, where the local communication device is prohibited from transmitting data, and can only receive data until state machine 802 transitions back to client state 1306 upon receiving an event from network assessment module 804 indicating a stable network condition.

Figure 14:
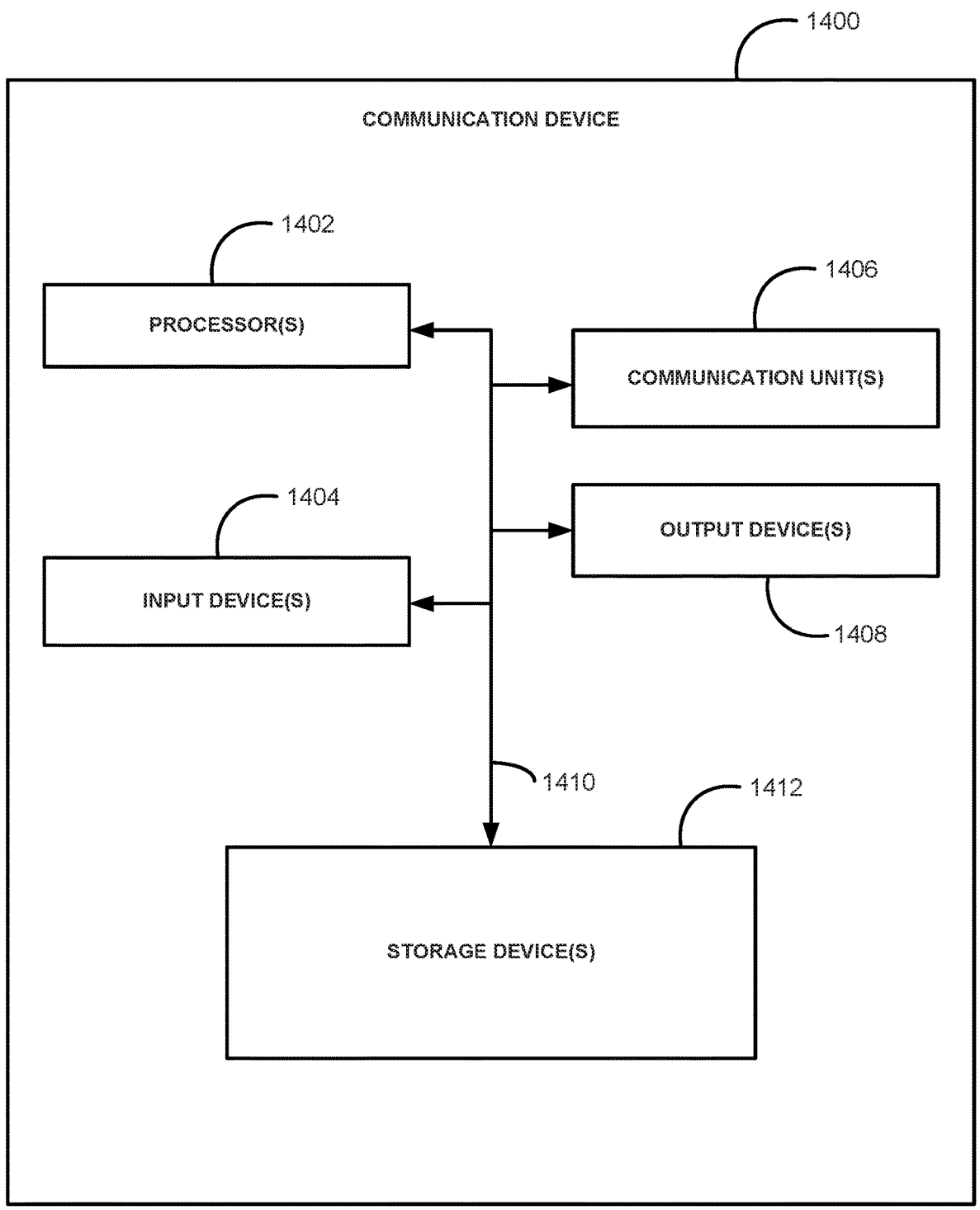
FIG. 14 is a schematic of portions of an example communication device, in accordance with one or more techniques of the present disclosure.

FIG. 14 is a schematic of portions of an example communication device 1400, in accordance with one or more techniques of the present disclosure. For example, communication device 1400 may be an example of one or more of communication device 100 (FIG. 1) or communication device 200 (FIG. 2). FIG. 14 illustrates only one particular example of communication device 1400, and many other examples of communication device 1400 may be used in other instances and may include a subset of the components shown, or may include additional components not shown, in FIG. 14.

As shown in the example of FIG. 14, communication device 1400 includes one or more processors 1402, one or more input devices 1404, one or more communication units 1406, one or more output devices 1408, and one or more storage devices 1412. Communication channels 1410 may interconnect each of the components 452, 454, 456, 458, and 460 for inter-component communications (physically, communicatively, and/or operatively). In some examples, communication channels 1410 may include a system bus, a network connection, an inter-process communication data structure, or any other method for communicating data between hardware and/or software.

One or more input devices 1404 of communication device 1400 may receive input. Examples of input are tactile, audio, and video input. Examples of input devices 1404 include a presence-sensitive screen, touch-sensitive screen, mouse, keyboard, voice responsive system, video camera, microphone or any other type of device for detecting input from a human or machine.

One or more output devices 1408 of communication device 1400 may generate output. Examples of output are tactile, audio, and video output. Examples of output devices 1408 include a presence-sensitive screen, sound card, video graphics adapter card, speaker, cathode ray tube (CRT) monitor, liquid crystal display (LCD), or any other type of device for generating output to a human or machine. Output devices 1408 may include display devices such as cathode ray tube (CRT) monitor, liquid crystal display (LCD), or any other type of device for generating tactile, audio, and/or visual output.

One or more communication units 1406 of communication device 1400 may communicate with one or more other computing systems or devices via one or more networks by transmitting and/or receiving network signals on the one or more networks. Examples of communication units 1406 include a network interface card (e.g. such as an Ethernet card), an optical transceiver, a radio frequency transceiver, or any other type of device that can send and/or receive information, such as through a wired or wireless network. Other examples of communication units 1406 may include short wave radios, cellular data radios, wireless Ethernet network radios, as well as universal serial bus (USB) controllers. Communication units 1406 may provide wired and/or wireless communication.

One or more storage devices 1412 within communication device 1400 may store information for processing during operation of communication device 1400 (e.g., communication device 1400 may store data accessed by one or more modules, processes, applications, or the like during execution at communication device 1400). In some examples, storage devices 1412 on communication device 1400 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage devices 1412, in some examples, also include one or more computer-readable storage media. Storage devices 1412 may be configured to store larger amounts of information than volatile memory. Storage devices 1412 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 1412 may store program instructions and/or data associated with one or more software/firmware elements or modules. For example, storage devices 1412 may store instructions and/or data associated with protocol modules 800 shown in FIG. 8, including state machine 802, network assessment module 804, and/or beacon module 806.

Communication device 1400 further includes one or more processors 1402 that may implement functionality and/or execute instructions within communication device 1400. For example, processors 1402 may receive and execute instructions stored by storage devices 1412 that execute the functionality of the elements and/or modules described herein (e.g., protocol modules 800 shown in FIG. 8). These instructions executed by processors 1402 may cause communication device 1400 to store information within storage devices 1412 during program execution. Processors 1402 may also execute instructions of the operating system to perform one or more operations described herein.

Figure 15:
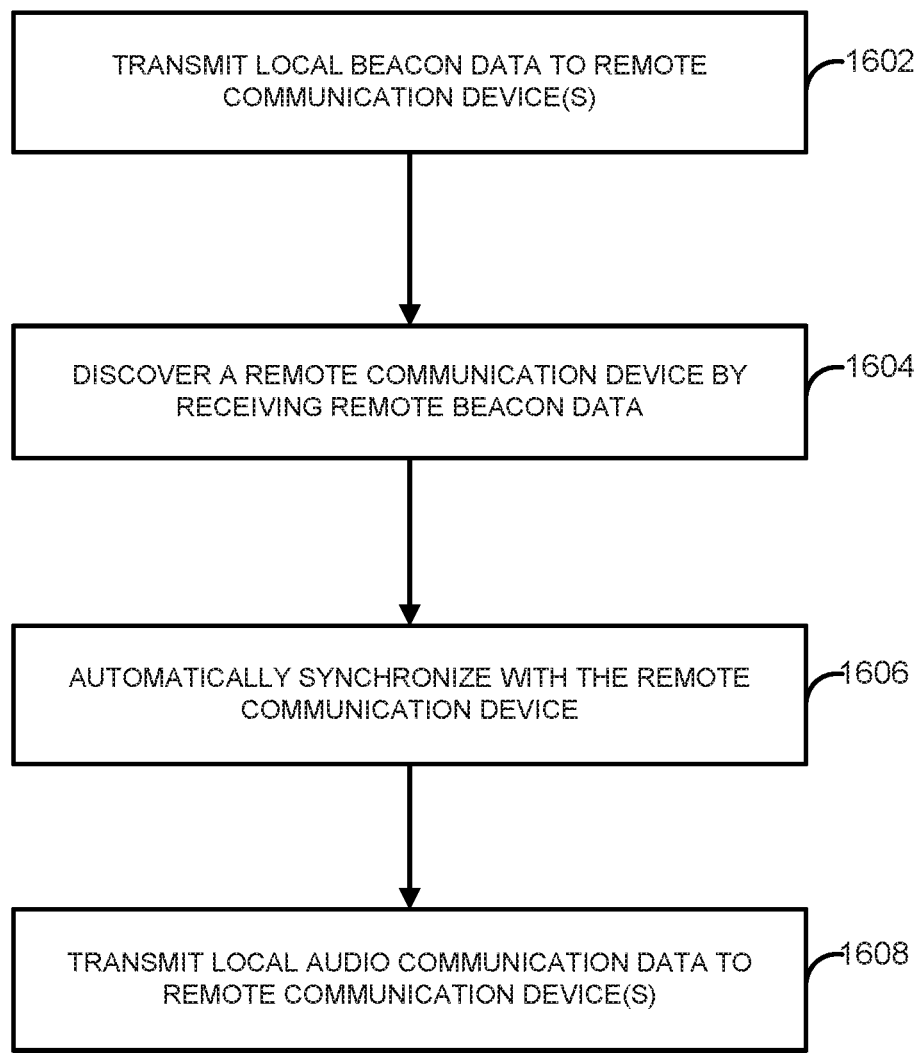
FIG. 15 is a flow chart depicting an example process for synchronization with a remote communication device through use of received beacon data, in accordance with one or more techniques of the present disclosure.

FIG. 15 is a flow chart depicting an example process for synchronization by a local communication device with a remote communication device through use of a received beacon, in accordance with one or more techniques of the present disclosure. For example, communication device 100 (FIG. 1) or communication device 200 (FIG. 2) may perform the operations of the example process illustrated in FIG. 15.

For purposes of illustration only, it will be assumed that communication device 200 of FIG. 2 performs the operations of the example process illustrated in FIG. 15. In this example, communication device 200 may comprise a headset communication device that is configured to communicate with one or more remote headset communication devices. Headset communication device 200 may transmit (1502), via a dedicated virtual communication channel (e.g., channel 900.0 shown in FIG. 9) of a wireless communication protocol (e.g., NIB protocol), local beacon data to one or more remote headset communication devices within a work environment. Each headset communication device is associated with a respective worker within the work environment and is configured to communicate using the wireless communication protocol to enable wireless voice conferencing between the workers without use of a base station.

Headset communication device 200 may discover (1504) a remote headset communication device included in the one or more remote headset communication devices by receiving, via the dedicated virtual communication channel of the wireless communication protocol, remote beacon data that is transmitted by the remote headset communication device and that is different from the local beacon data. Responsive to discovering the remote headset communication device, headset communication device 200 may automatically synchronize (1506), based on the remote beacon data, headset communication device 200 with the remote headset communication device. After synchronizing headset communication device 200 with the remote headset communication device, headset communication device 200 may transmit (1508), via one or more additional virtual communication channels (e.g., one or more of channels 900.1-900.N shown in FIG. 9) of the wireless communication protocol, local audio communication data to the one or more remote headset communication devices.

The following numbered examples may illustrate one or more aspects of the present application.

Example 1

A headset communication device, comprising: a computer-readable storage medium; and at least one processor coupled to the computer-readable storage medium and configured to: transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station; discover a remote headset communication device included in the one or more remote headset communication devices by receiving, via the dedicated virtual communication channel of the wireless communication protocol, remote beacon data that is transmitted by the remote headset communication device and that is different from the local beacon data; responsive to discovering the remote headset communication device, automatically synchronize, based on the remote beacon data, the headset communication device with the remote headset communication device; and after synchronizing the headset communication device with the remote headset communication device, transmit, via one or more additional virtual communication channels of the wireless communication protocol, local audio communication data to the one or more remote headset communication devices.

Example 2

The headset communication device of Example 1, wherein the headset communication device is further configured to: determine a beacon interval that defines an amount of time between the local beacon data that is transmitted by the headset communication device; and periodically transmit, via the dedicated virtual communication channel, and based on the beacon interval, the local beacon data to the one or more remote headset communication devices.

Example 3

The headset communication device of Example 2, wherein the beacon interval includes a plurality of frames, and wherein the at least one processor is configured to periodically transmit the local beacon data to the one or more remote headset communication devices based on the beacon interval at least by being configured to: determine an offset to a beginning of each occurrence of the beacon interval, wherein the offset comprises one or more of the plurality of frames; and periodically transmit, via the dedicated virtual communication channel, the local beacon data to the one or more remote headset communication devices at the offset to the beginning of each occurrence of the beacon interval.

Example 4

The headset communication device of Example 3, wherein the offset comprises a positive offset of the one or more of the plurality of frames to the beginning of each occurrence of the beacon interval.

Example 5

The headset communication device of Example 3, wherein the at least one processor is configured to determine the offset at least by being configured to determine a random number of the one or more of the plurality of frames offset from the beginning of each occurrence of the beacon interval.

Example 6

The headset communication device of any of Examples 1-5, wherein the at least one processor is configured to transmit the local beacon data at a different time than the remote headset communication device transmits the remote beacon data.

Example 7

The headset communication device of any of Examples 1-6, wherein the at least one processor is further configured to: after synchronizing the headset communication device with the remote headset communication device, determine that a quality of a communication network between the headset communication device and the remote communication device exceeds a defined threshold; and transmit the local audio communication data to the one or more remote headset communication devices responsive to determining that the quality of the communication network exceeds the defined threshold.

Example 8

The headset communication device of any of Examples 1-7, wherein the at least one processor is configured to transmit the local audio communication data to the one or more remote headset communication devices at least by being configured to: determine an available virtual communication channel from the one or more additional virtual communication channels, wherein the available virtual communication channel is currently unused by the one or more remote headset communication devices; and transmit, via the available virtual communication channel, the local audio communication data to the one or more remote headset communication devices.

Example 9

The headset communication device of any of Examples 1-8, wherein the remote beacon data comprises first remote beacon data, and wherein the at least one processor is further configured to: after transmitting the local audio communication data to the one or more remote headset communication devices, determine whether the headset communication device has received second remote beacon data from the remote headset communication device via the dedicated virtual communication channel; and responsive to determining that the headset communication device has not received second remote beacon data from the remote headset communication device via the dedicated virtual communication channel, refrain from transmitting additional local audio communication data to the one or more remote headset communication devices via the one or more additional virtual communication channels.

Example 10

The headset communication device of Example 9, wherein the at least one processor is configured to determine that the headset communication device has not received the second remote beacon data from the remote headset communication device via the dedicated virtual communication channel at least by being configured to: determine a beacon interval that defines an amount of time between beacon data that is received from the remote headset communication device; and determine that the headset communication device has not received, from the remote headset communication device via the dedicated virtual communication channel, a defined number of consecutive beacons that are each separated by the beacon interval, wherein each of the consecutive beacons comprises respective beacon data.

Example 11

The headset communication device of any of Examples 1-10, wherein the remote beacon data includes a serial number of the remote headset communication device, and wherein the at least one processor is configured to synchronize the headset communication device with the remote headset communication device responsive to determining that the serial number of the remote headset communication device is lower than a serial number of the headset communication device.

Example 12

The headset communication device of any of Examples 1-11, wherein the at least one processor is further configured to: maintain a local time counter that is used by the headset communication device to control data communication with the one or more remote headset communication devices via the wireless communication protocol; synchronize the headset communication device with the remote headset communication device by resetting, based on the remote beacon data, the local time counter to match a remote time counter of the remote communication device as indicated by the remote beacon data; and transmit, via the one or more additional virtual communication channels, and based on the reset local time counter, the local audio communication data to the one or more remote headset communication devices.

Example 13

The headset communication device of any of Examples 1-12, further comprising a speaker that is coupled to the at least one processor and that is configured to output one or more sound waves, wherein the at least one processor is further configured to: receive, via the one or more additional virtual communication channels and from the remote headset communication device, remote audio communication data; determine a distance between the headset communication device and the remote headset communication device; determine, based on the distance, a volume level; and provide, for output at the speaker at the determined volume level, the remote audio communication data.

Example 14

The headset communication device of Example 13, further comprising: a microphone; a first ear cup; and a second ear cup coupled to the first ear cup with a headband, wherein the speaker is disposed in at least one of the first ear cup or the second ear cup.

Example 15

The headset communication device of Example 13, wherein when the at least one processor is configured to determine that the distance between the headset communication device and the remote headset communication device is greater than or equal to a threshold distance, the at least one processor is configured to determine that the volume level is zero.

Example 16

The headset communication device of Example 13, wherein the at least one processor is configured to determine the distance between the headset communication device and the remote headset communication device based on a received signal strength indicator associated with the remote audio communication data.

Example 17

The headset communication device of any of Examples 1-16, wherein the headset communication device is included in one of a welding mask, a respiration mask, or a hearing protection headset.

Example 18

A computer-readable storage medium storing instructions that, when executed, cause at least one processor of a headset communication device to: transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station; discover a remote headset communication device included in the one or more remote headset communication devices by receiving, via the dedicated virtual communication channel of the wireless communication protocol, remote beacon data that is transmitted by the remote headset communication device and that is different from the local beacon data; responsive to discovering the remote headset communication device, automatically synchronize, based on the remote beacon data, the headset communication device with the remote headset communication device; and after synchronizing the headset communication device with the remote headset communication device, transmit, via one or more additional virtual communication channels of the wireless communication protocol, local audio communication data to the one or more remote headset communication devices.

Example 19

The computer-readable storage medium of Example 18, wherein the instructions further cause the at least one processor of the headset communication device to: determine a beacon interval that defines an amount of time between the local beacon data that is transmitted by the headset communication device; and periodically transmit, via the dedicated virtual communication channel, and based on the beacon interval, the local beacon data to the one or more remote headset communication devices.

Example 20

The computer-readable storage medium of Example 19, wherein the beacon interval includes a plurality of frames, and wherein the instructions that cause the at least one processor of the headset communication device to periodically transmit the local beacon data to the one or more remote headset communication devices based on the beacon interval further cause the at least one processor of the headset communication device to: determine an offset to a beginning of each occurrence of the beacon interval, wherein the offset comprises one or more of the plurality of frames; and periodically transmit, via the dedicated virtual communication channel, the local beacon data to the one or more remote headset communication devices at the offset to the beginning of each occurrence of the beacon interval.

Example 21

The computer-readable storage medium of Example 20, wherein the offset comprises a positive offset of the one or more of the plurality of frames to the beginning of each occurrence of the beacon interval.

Example 22

The computer-readable storage medium of Example 20, wherein the instructions that cause the at least one processor of the headset communication device to determine the offset further cause the at least one processor of the headset communication device to determine a random number of the one or more of the plurality of frames offset from the beginning of each occurrence of the beacon interval.

Example 23

The computer-readable storage medium of any of Examples 18-22, wherein the instructions cause the at least one processor of the headset communication device to transmit the local beacon data at a different time than the remote headset communication device transmits the remote beacon data.

Example 24

The computer-readable storage medium of any of Examples 18-23, wherein the instructions further cause the at least one processor of the headset communication device to: after synchronizing the headset communication device with the remote headset communication device, determine that a quality of a communication network between the headset communication device and the remote communication device exceeds a defined threshold; and transmit the local audio communication data to the one or more remote headset communication devices responsive to determining that the quality of the communication network exceeds the defined threshold.

Example 25

The computer-readable storage medium of any of Examples 18-24, wherein the instructions that cause the at least one processor of the headset communication device to transmit the local audio communication data to the one or more remote headset communication devices further cause the at least one processor of the headset communication device to: determine an available virtual communication channel from the one or more additional virtual communication channels, wherein the available virtual communication channel is currently unused by the one or more remote headset communication devices; and transmit, via the available virtual communication channel, the local audio communication data to the one or more remote headset communication devices.

Example 26

The computer-readable storage medium of any of Examples 18-25, wherein the remote beacon data comprises first remote beacon data, and wherein the instructions further cause the at least one processor of the headset communication device to: after transmitting the local audio communication data to the one or more remote headset communication devices, determine whether the headset communication device has received second remote beacon data from the remote headset communication device via the dedicated virtual communication channel; and responsive to determining that the headset communication device has not received second remote beacon data from the remote headset communication device via the dedicated virtual communication channel, refrain from transmitting additional local audio communication data to the one or more remote headset communication devices via the one or more additional virtual communication channels.

Example 27

The computer-readable storage medium of claim 26, wherein the instructions that cause the at least one processor of the headset communication device to determine that the headset communication device has not received the second remote beacon data from the remote headset communication device via the dedicated virtual communication channel further cause the at least one processor of the headset communication device to: determine a beacon interval that defines an amount of time between beacon data that is received from the remote headset communication device; and determine that the headset communication device has not received, from the remote headset communication device via the dedicated virtual communication channel, a defined number of consecutive beacons that are each separated by the beacon interval, wherein each of the consecutive beacons comprises respective beacon data.

Example 28

The computer-readable storage medium of any of Examples 18-27, wherein the remote beacon data includes a serial number of the remote headset communication device, and wherein the instructions cause the at least one processor of the headset communication device to synchronize the headset communication device with the remote headset communication device responsive to determining that the serial number of the remote headset communication device is lower than a serial number of the headset communication device.

Example 29

The computer-readable storage medium of any of Examples 18-28, wherein the instructions further cause the at least one processor of the headset communication device to: maintain a local time counter that is used by the headset communication device to control data communication with the one or more remote headset communication devices via the wireless communication protocol; synchronize the headset communication device with the remote headset communication device by resetting, based on the remote beacon data, the local time counter to match a remote time counter of the remote communication device as indicated by the remote beacon data; and transmit, via the one or more additional virtual communication channels, and based on the reset local time counter, the local audio communication data to the one or more remote headset communication devices.

Example 30

The computer-readable storage medium of any of Examples 18-29, wherein the headset communication device further comprises a speaker, and wherein the instructions further cause the at least one processor of the headset communication device to: receive, via the one or more additional virtual communication channels and from the remote headset communication device, remote audio communication data; determine a distance between the headset communication device and the remote headset communication device; determine, based on the distance, a volume level; and provide, for output at the speaker at the determined volume level, the remote audio communication data.

Example 31

The computer-readable storage medium of Example 30, wherein the headset communication device further comprises a microphone, a first ear cup, and a second ear cup coupled to the first ear cup with a headband, wherein the speaker is disposed in at least one of the first ear cup or the second ear cup.

Example 32

The computer-readable storage medium of Example 30, wherein when the instructions cause the at least one processor of the headset communication device to determine that the distance between the headset communication device and the remote headset communication device is greater than or equal to a threshold distance, the instructions cause the at least one processor of the headset communication device to determine that the volume level is zero.

Example 33

The computer-readable storage medium of Example 30, wherein the instructions cause the at least one processor of the headset communication device to determine the distance between the headset communication device and the remote headset communication device based on a received signal strength indicator associated with the remote audio communication data.

Example 34

The computer-readable storage medium of any of Examples 18-33, wherein the headset communication device is included in one of a welding mask, a respiration mask, or a hearing protection headset.

Example 35

A method comprising: transmitting, by a headset communication device via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station; discovering, by the headset communication device, a remote headset communication device included in the one or more remote headset communication devices by receiving, via the dedicated virtual communication channel of the wireless communication protocol, remote beacon data that is transmitted by the remote headset communication device and that is different from the local beacon data; responsive to discovering the remote headset communication device, automatically synchronizing, by the headset communication device, based on the remote beacon data, the headset communication device with the remote headset communication device; and after synchronizing the headset communication device with the remote headset communication device, transmitting, by the headset communication device via one or more additional virtual communication channels of the wireless communication protocol, local audio communication data to the one or more remote headset communication devices.

Example 36

The method of Example 35, further comprising: determining a beacon interval that defines an amount of time between the local beacon data that is transmitted by the headset communication device; and periodically transmitting, via the dedicated virtual communication channel, and based on the beacon interval, the local beacon data to the one or more remote headset communication devices.

Example 37

The method of Example 36, wherein the beacon interval includes a plurality of frames, and wherein periodically transmitting the local beacon data to the one or more remote headset communication devices based on the beacon interval includes: determining an offset to a beginning of each occurrence of the beacon interval, wherein the offset comprises one or more of the plurality of frames; and periodically transmitting, via the dedicated virtual communication channel, the local beacon data to the one or more remote headset communication devices at the offset to the beginning of each occurrence of the beacon interval.

Example 38

The method of Example 37, wherein the offset comprises a positive offset of the one or more of the plurality of frames to the beginning of each occurrence of the beacon interval.

Example 39

The method of Example 37, wherein determining the offset includes determining a random number of the one or more of the plurality of frames offset from the beginning of each occurrence of the beacon interval.

Example 40

The method of any of Examples 35-39, wherein transmitting the local beacon data comprises transmitting the local beacon data at a different time than the remote headset communication device transmits the remote beacon data.

Example 41

The method of any of Examples 35-40, further comprising: after synchronizing the headset communication device with the remote headset communication device, determining that a quality of a communication network between the headset communication device and the remote communication device exceeds a defined threshold; and transmitting the local audio communication data to the one or more remote headset communication devices responsive to determining that the quality of the communication network exceeds the defined threshold.

Example 42

The method of any of Examples 35-41, wherein transmitting the local audio communication data to the one or more remote headset communication devices includes: determining an available virtual communication channel from the one or more additional virtual communication channels, wherein the available virtual communication channel is currently unused by the one or more remote headset communication devices; and transmitting, via the available virtual communication channel, the local audio communication data to the one or more remote headset communication devices.

Example 43

The method of any of Examples 35-42, wherein the remote beacon data comprises first remote beacon data, and wherein the method further comprises: after transmitting the local audio communication data to the one or more remote headset communication devices, determining whether the headset communication device has received second remote beacon data from the remote headset communication device via the dedicated virtual communication channel; and responsive to determining that the headset communication device has not received second remote beacon data from the remote headset communication device via the dedicated virtual communication channel, refraining from transmitting additional local audio communication data to the one or more remote headset communication devices via the one or more additional virtual communication channels.

Example 44

The method of claim 43, wherein determining that the headset communication device has not received the second remote beacon data from the remote headset communication device via the dedicated virtual communication channel includes: determining a beacon interval that defines an amount of time between beacon data that is received from the remote headset communication device; and determining that the headset communication device has not received, from the remote headset communication device via the dedicated virtual communication channel, a defined number of consecutive beacons that are each separated by the beacon interval, wherein each of the consecutive beacons comprises respective beacon data.

Example 45

The method of any of Examples 35-44, wherein the remote beacon data includes a serial number of the remote headset communication device, and wherein synchronizing the headset communication device with the remote headset communication device occurs responsive to determining that the serial number of the remote headset communication device is lower than a serial number of the headset communication device.

Example 46

The method of any of Examples 35-45, further comprising: maintaining a local time counter that is used by the headset communication device to control data communication with the one or more remote headset communication devices via the wireless communication protocol; synchronizing the headset communication device with the remote headset communication device by resetting, based on the remote beacon data, the local time counter to match a remote time counter of the remote communication device as indicated by the remote beacon data; and transmitting, via the one or more additional virtual communication channels, and based on the reset local time counter, the local audio communication data to the one or more remote headset communication devices.

Example 47

The method of any of Examples 35-46, wherein the headset communication device further comprises a speaker, and wherein the method further comprises: receiving, via the one or more additional virtual communication channels and from the remote headset communication device, remote audio communication data; determining a distance between the headset communication device and the remote headset communication device; determining, based on the distance, a volume level; and providing, for output at the speaker at the determined volume level, the remote audio communication data.

Example 48

The method of Example 47, wherein the headset communication device further comprises a microphone, a first ear cup, and a second ear cup coupled to the first ear cup with a headband, wherein the speaker is disposed in at least one of the first ear cup or the second ear cup.

Example 49

The method of Example 47, wherein determining the volume level comprises determining that the volume level is zero responsive to determining that the distance between the headset communication device and the remote headset communication device is greater than or equal to a threshold distance.

Example 50

The method of Example 47, wherein determining the distance between the headset communication device and the remote headset communication device is based on a received signal strength indicator associated with the remote audio communication data.

Example 51

The method of any of Examples 35-50, wherein the headset communication device is included in one of a welding mask, a respiration mask, or a hearing protection headset.

43

Example 52

A headset communication device comprising means for performing the method of any of Examples 35-51.

Example 53

A computer-readable storage medium storing instructions that, when executed, cause at least one processor of a headset communication device to perform the method of any of Examples 35-51.

Example 54

A headset communication device, comprising: a memory; and at least one processor coupled to the memory and configured to: transmit, via a wireless communication protocol, first communication data to one or more remote headset communication devices within an environment, each headset communication device being associated with a respective user within the work environment and being configured to communicate using the wireless communication protocol to enable voice communication between the users without use of a base station; receive, via the communication protocol, second communication data that is transmitted by a remote headset communication device included in the one or more remote headset communication devices; responsive to determining that the second communication data includes a defined signal, synchronize the headset communication device with the remote headset communication device by resetting an internal time counter to match a time counter of the remote headset communication device as indicated by the defined signal; and after synchronizing the headset communication device with the remote headset communication device, transmit, via the wireless communication protocol, third communication data to the one or more remote headset communication devices.

Example 55

The headset communication device of Example 54, further comprising: a speaker coupled to the at least one processor, wherein the speaker is configured to output a sound wave based on an output from the at least one processor; a first ear cup; and a second ear cup coupled to the first ear cup with a headband, wherein the speaker is disposed in at least one of the first ear cup or the second ear cup, wherein the at least one processor is configured to determine a distance between the headset communication device and the remote headset communication device, and wherein a volume of the sound wave is reduced in proportion to the distance between the headset communication device and the remote headset communication device.

Example 56

The headset communication device of Example 55, wherein when the distance is greater than or equal to a threshold distance, the volume is zero.

Example 57

The headset communication device of Example 55, wherein the distance is calculated using a received signal strength indicator.

Example 58

The headset communication device of any of Examples 54-57, wherein the defined signal is included in a data header of the second communication data that is sent from the remote communication device.

Example 59

The headset communication device of any of Examples 54-58, wherein the headset communication device is included in one of a welding mask, a respiration mask, or a hearing protection headset.

Example 60

A memory stores instructions that, when executed, cause at least one processor of a headset communication device to: transmit, via a wireless communication protocol, first communication data to one or more remote headset communication devices within an environment, each headset communication device being associated with a respective user within the work environment and being configured to communicate using the wireless communication protocol to enable voice communication between the users without use of a base station; receive, via the communication protocol, second communication data that is transmitted by a remote headset communication device included in the one or more remote headset communication devices; responsive to determining that the second communication data includes a defined signal, synchronize the headset communication device with the remote headset communication device by resetting an internal time counter to match a time counter of the remote headset communication device as indicated by the defined signal; and, after synchronizing the headset communication device with the remote headset communication device, transmit, via the wireless communication protocol, third communication data to the one or more remote headset communication devices.

Example 61

The memory of Example 60, wherein the headset communication device further comprises a speaker coupled to the at least one processor, a first ear cup, and a second ear cup coupled to the first ear cup with a headband, wherein the speaker is configured to output a sound wave based on an output from the at least one processor, wherein the speaker is disposed in at least one of the first ear cup or the second ear cup, wherein the at least one processor is configured to determine a distance between the headset communication device and the remote headset communication device, and wherein a volume of the sound wave is reduced in proportion to the distance between the headset communication device and the remote headset communication device.

Example 62

The memory of Example 61, wherein when the distance is greater than or equal to a threshold distance, the volume is zero.

Example 63

The memory of Example 61, wherein the distance is calculated using a received signal strength indicator.

Example 64

The memory of any of Examples 60-63, wherein the defined signal is included in a data header of the second communication data that is sent from the remote communication device.

Example 65

The memory of any of Examples 60-65, wherein the headset communication device is included in one of a welding mask, a respiration mask, or a hearing protection headset.

Example 66

A method comprising: transmitting, by a headset communication device via a wireless communication protocol, first communication data to one or more remote headset communication devices within an environment, each headset communication device being associated with a respective user within the work environment and being configured to communicate using the wireless communication protocol to enable voice communication between the users without use of a base station; receiving, by the headset communication device via the communication protocol, second communication data that is transmitted by a remote headset communication device included in the one or more remote headset communication devices; responsive to determining that the second communication data includes a defined signal, synchronizing the headset communication device with the remote headset communication device by resetting an internal time counter to match a time counter of the remote headset communication device as indicated by the defined signal; and, after synchronizing the headset communication device with the remote headset communication device, transmitting, by the headset communication device via the wireless communication protocol, third communication data to the one or more remote headset communication devices.

Example 67

The method of Example 66, wherein the headset communication device further comprises a speaker coupled to the at least one processor, a first ear cup, and a second ear cup coupled to the first ear cup with a headband, wherein the speaker is disposed in at least one of the first ear cup or the second ear cup, wherein the speaker is configured to output a sound wave, wherein the method further comprises determining a distance between the headset communication device and the remote headset communication device, and wherein a volume of the sound wave is reduced in proportion to the distance between the headset communication device and the remote headset communication device.

Example 68

The method of Example 67, wherein when the distance is greater than or equal to a threshold distance, the volume is zero.

Example 69

The method of Example 67, wherein the distance is calculated using a received signal strength indicator.

Example 70

The method of any of Examples 66-69, wherein the defined signal is included in a data header of the second communication data that is sent from the remote communication device.

Example 71

The method of any of Examples 66-70, wherein the headset communication device is included in one of a welding mask, a respiration mask, or a hearing protection headset.

Example 72

A headset communication device comprising means for performing the method of any of Examples 66-71.

Example 73

A memory storing instructions that, when executed, cause at least one processor of a headset communication device to perform the method of any of Examples 66-71.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically erasable programmable read-only memory (EEPROM), compact disc read-only memory (CD-ROM), or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSP's), general purpose microprocessors, application specific integrated circuits (ASIC's), field programmable logic arrays (FPGA's), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Further, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A headset communication device, comprising:
a computer-readable storage medium;
at least one processor coupled to the computer-readable storage medium and configured to:
transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station;
discover a remote headset communication device included in the one or more remote headset communication devices by receiving, via the dedicated virtual communication channel of the wireless communication protocol, remote beacon data that is transmitted by the remote headset communication device and that is different from the local beacon data;
responsive to discovering the remote headset communication device, automatically synchronize, based on the remote beacon data, the headset communication device with the remote headset communication device; and
after synchronizing the headset communication device with the remote headset communication device, transmit, via one or more additional virtual communication channels of the wireless communication protocol, local audio communication data to the one or more remote headset communication devices;
wherein the headset communication device is further configured to:
determine a beacon interval that defines an amount of time between the local beacon data that is transmitted by the headset communication device; and
periodically transmit, via the dedicated virtual communication channel, and based on the beacon interval, the local beacon data to the one or more remote headset communication devices; and
wherein the beacon interval includes a plurality of frames, and wherein the at least one processor is configured to periodically transmit the local beacon data to the one or more remote headset communication devices based on the beacon interval at least by being configured to:
determine an offset to a beginning of each occurrence of the beacon interval, wherein the offset comprises one or more of the plurality of frames; and
periodically transmit, via the dedicated virtual communication channel, the local beacon data to the one or more remote headset communication devices at the offset to the beginning of each occurrence of the beacon interval.

2. The headset communication device of claim 1, wherein the offset comprises a positive offset of the one or more of the plurality of frames to the beginning of each occurrence of the beacon interval.

3. The headset communication device of claim 1, wherein the at least one processor is configured to determine the offset at least by being configured to determine a random number of the one or more of the plurality of frames offset from the beginning of each occurrence of the beacon interval.

4. The headset communication device of claim 1, wherein the at least one processor is configured to transmit the local beacon data at a different time than the remote headset communication device transmits the remote beacon data.

5. The headset communication device of claim 1, wherein the at least one processor is further configured to:
after synchronizing the headset communication device with the remote headset communication device, determine that a quality of a communication network between the headset communication device and the remote communication device exceeds a defined threshold; and
transmit the local audio communication data to the one or more remote headset communication devices responsive to determining that the quality of the communication network exceeds the defined threshold.

6. The headset communication device of claim 1, wherein the at least one processor is configured to transmit the local audio communication data to the one or more remote headset communication devices at least by being configured to:
determine an available virtual communication channel from the one or more additional virtual communication channels, wherein the available virtual communication channel is currently unused by the one or more remote headset communication devices; and
transmit, via the available virtual communication channel, the local audio communication data to the one or more remote headset communication devices.

7. The headset communication device of claim 1, wherein the at least one processor is further configured to:

maintain a local time counter that is used by the headset communication device to control data communication with the one or more remote headset communication devices via the wireless communication protocol;

synchronize the headset communication device with the remote headset communication device by resetting, based on the remote beacon data, the local time counter to match a remote time counter of the remote communication device as indicated by the remote beacon data; and transmit, via the one or more additional virtual communication channels, and based on the reset local time counter, the local audio communication data to the one or more remote headset communication devices.

8. The headset communication device of claim 1, further comprising a speaker that is coupled to the at least one processor and that is configured to output one or more sound waves, wherein the at least one processor is further configured to:

receive, via the one or more additional virtual communication channels and from the remote headset communication device, remote audio communication data;

determine a distance between the headset communication device and the remote headset communication device;

determine, based on the distance, a volume level; and provide, for output at the speaker at the determined volume level, the remote audio communication data.

9. The headset communication device of claim 8, further comprising:

a microphone;

a first ear cup; and a second ear cup coupled to the first ear cup with a headband, wherein the speaker is disposed in at least one of the first ear cup or the second ear cup.

10. The headset communication device of claim 8, wherein when the at least one processor is configured to determine that the distance between the headset communication device and the remote headset communication device is greater than or equal to a threshold distance, the at least one processor is configured to determine that the volume level is zero.

11. The headset communication device of claim 8, wherein the at least one processor is configured to determine the distance between the headset communication device and the remote headset communication device based on a received signal strength indicator associated with the remote audio communication data.

12. The headset communication device of claim 1, wherein the headset communication device is included in one of a welding mask, a respiration mask, or a hearing protection headset.

13. A headset communication device, comprising:

a computer-readable storage medium; and at least one processor coupled to the computer-readable storage medium and configured to:

transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station;

discover a remote headset communication device included in the one or more remote headset communication devices by receiving, via the dedicated virtual communication channel of the wireless communication protocol, remote beacon data that is transmitted by the remote headset communication device and that is different from the local beacon data;

responsive to discovering the remote headset communication device, automatically synchronize, based on the remote beacon data, the headset communication device with the remote headset communication device; and after synchronizing the headset communication device with the remote headset communication device, transmit, via one or more additional virtual communication channels of the wireless communication protocol, local audio communication data to the one or more remote headset communication devices;

wherein the remote beacon data comprises first remote beacon data, and wherein the at least one processor is further configured to:

after transmitting the local audio communication data to the one or more remote headset communication devices, determine whether the headset communication device has received second remote beacon data from the remote headset communication device via the dedicated virtual communication channel; and responsive to determining that the headset communication device has not received second remote beacon data from the remote headset communication device via the dedicated virtual communication channel, refrain from transmitting additional local audio communication data to the one or more remote headset communication devices via the one or more additional virtual communication channels.

14. The headset communication device of claim 9, wherein the at least one processor is configured to determine that the headset communication device has not received the second remote beacon data from the remote headset communication device via the dedicated virtual communication channel at least by being configured to:

determine a beacon interval that defines an amount of time between beacon data that is received from the remote headset communication device; and determine that the headset communication device has not received, from the remote headset communication device via the dedicated virtual communication channel, a defined number of consecutive beacons that are each separated by the beacon interval, wherein each of the consecutive beacons comprises respective beacon data.

15. A headset communication device, comprising:

a computer-readable storage medium; and at least one processor coupled to the computer-readable storage medium and configured to:

transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station;

discover a remote headset communication device included in the one or more remote headset communication devices by receiving, via the dedicated virtual communication channel of the wireless communication protocol, remote beacon data that is transmitted by the remote headset communication device and that is different from the local beacon data;

responsive to discovering the remote headset communication device, automatically synchronize, based on the remote beacon data, the headset communication device with the remote headset communication device;

after synchronizing the headset communication device with the remote headset communication device, transmit, via one or more additional virtual communication channels of the wireless communication protocol local audio communication data to the one or more remote headset communication devices;

wherein the remote beacon data includes a serial number of the remote headset communication device, and wherein the at least one processor is configured to synchronize the headset communication device with the remote headset communication device responsive to determining that the serial number of the remote headset communication device is lower than a serial number of the headset communication device.

16. A non-transitory computer-readable storage medium storing instructions that, when executed, cause at least one processor of a headset communication device to:

transmit, via a dedicated virtual communication channel of a wireless communication protocol, local beacon data to one or more remote headset communication devices within a work environment, each headset communication device associated with a respective worker within the work environment and being configured to communicate using the wireless communication protocol to enable wireless voice conferencing between the workers without use of a base station;

discover a remote headset communication device included in the one or more remote headset communication devices by receiving, via the dedicated virtual communication channel of the wireless communication protocol, remote beacon data that is transmitted by the remote headset communication device and that is different from the local beacon data;

responsive to discovering the remote headset communication device, automatically synchronize, based on the remote beacon data, the headset communication device with the remote headset communication device;

after synchronizing the headset communication device with the remote headset communication device, transmit, via one or more additional virtual communication channels of the wireless communication protocol, local audio communication data to the one or more remote headset communication devices;

wherein the instructions further cause the at least one processor of the headset communication device to:
determine a beacon interval that defines an amount of time between the local beacon data that is transmitted by the headset communication device; and periodically transmit, via the dedicated virtual communication channel, and based on the beacon interval, the local beacon data to the one or more remote headset communication devices; and wherein the beacon interval includes a plurality of frames, and wherein the instructions that cause the at least one processor of the headset communication device to periodically:
transmit the local beacon data to the one or more remote headset communication devices based on the beacon interval further cause the at least one processor of the headset communication device to:
determine an offset to a beginning of each occurrence of the beacon interval, wherein the offset comprises one or more of the plurality of frames; and
periodically transmit, via the dedicated virtual communication channel, the local beacon data to the one or more remote headset communication devices at the offset to the beginning of each occurrence of the beacon interval.

17. The non-transitory computer-readable storage medium of claim 16, wherein the instructions that cause the at least one processor of the headset communication device to determine the offset further cause the at least one processor of the headset communication device to determine a random number of the one or more of the plurality of frames offset from the beginning of each occurrence of the beacon interval.

18. The non-transitory computer-readable storage medium of claim 16, wherein the remote beacon data comprises first remote beacon data, and wherein the instructions further cause the at least one processor of the headset communication device to:

after transmitting the local audio communication data to the one or more remote headset communication devices, determine whether the headset communication device has received second remote beacon data from the remote headset communication device via the dedicated virtual communication channel; and responsive to determining that the headset communication device has not received second remote beacon data from the remote headset communication device via the dedicated virtual communication channel, refrain from transmitting additional local audio communication data to the one or more remote headset communication devices via the one or more additional virtual communication channels.

19. The non-transitory computer-readable storage medium of claim 16, wherein the headset communication device further comprises a speaker, and wherein the instructions further cause the at least one processor of the headset communication device to:

receive, via the one or more additional virtual communication channels and from the remote headset communication device, remote audio communication data;
determine a distance between the headset communication device and the remote headset communication device;
determine, based on the distance, a volume level; and
provide, for output at the speaker at the determined volume level, the remote audio communication data.

* * * * *